(12) United States Patent
Kamiguti et al.

(10) Patent No.: US 11,262,744 B2
(45) Date of Patent: Mar. 1, 2022

(54) DIAGNOSTIC SERVICE SYSTEM AND DIAGNOSTIC METHOD USING NETWORK

(71) Applicant: FANUC CORPORATION, Yamanashi (JP)

(72) Inventors: Masao Kamiguti, Yamanashi (JP); Norinaga Mutai, Yamanashi (JP); Yujiro Honda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 430 days.

(21) Appl. No.: 16/284,250

(22) Filed: Feb. 25, 2019

(65) Prior Publication Data

US 2019/0310620 A1    Oct. 10, 2019

(30) Foreign Application Priority Data

Apr. 6, 2018    (JP) .............................. JP2018-073778

(51) Int. Cl.
  *G05B 23/02*     (2006.01)
  *G05B 19/4062*   (2006.01)
  (Continued)

(52) U.S. Cl.
  CPC ..... *G05B 23/0283* (2013.01); *G05B 19/4062* (2013.01); *G05B 19/4184* (2013.01); *G05B 23/027* (2013.01); *G05B 23/0221* (2013.01); *G05B 23/0224* (2013.01); *G06F 11/0736* (2013.01); *G06F 11/0751* (2013.01); *G06F 11/0766* (2013.01)

(58) Field of Classification Search
  CPC .................................................. G05B 23/0283
  See application file for complete search history.

(56) References Cited

U.S. PATENT DOCUMENTS 9,786,138 B1 * 10/2017 Kashyap ............ G08B 13/2491

FOREIGN PATENT DOCUMENTS

| JP | 5-11834  | 1/1993  |
| JP | 5-284573 | 10/1993 |

(Continued)

OTHER PUBLICATIONS

Patel et al., "Intelligent Decision Support System for Diagnosisand Maintenance of Automated Systems", Elsevier 1996 (Year: 1996).*

(Continued)

*Primary Examiner* — Carlos R Ortiz Rodriguez
(74) *Attorney, Agent, or Firm* — Wenderoth, Lind & Ponack, L.L.P.

(57) ABSTRACT

To provide a diagnostic service system and diagnostic method using a network. A factory monitoring system (100) comprises a factory monitoring system (100) which includes: a data acquisition unit (1011) that acquires data related to at least one machine, including time information; and a stored data management unit (1012) that stores data related to each machine acquired by the data acquisition unit in a storage unit (1002) together with identification information of each machine, wherein, based on past history data related to the machine and current data related to the machine, the diagnostic service system (1) predicts a possibility of abnormality occurrence in the machine, and provides preventative maintenance information related to the machine.

5 Claims, 31 Drawing Sheets

(51) Int. Cl.
*G06F 11/07* (2006.01)
*G05B 19/418* (2006.01)

(56) References Cited

FOREIGN PATENT DOCUMENTS

| JP | 6-288797 | 10/1994 |
|---|---|---|
| JP | 10-222220 | 8/1998 |
| JP | 10-228311 | 8/1998 |
| JP | 11-119815 | 4/1999 |
| JP | 2001-236115 | 8/2001 |
| JP | 2008-203962 | 9/2008 |
| JP | 2015-060775 | 3/2015 |
| JP | 2015-146715 | 8/2015 |
| JP | 2015-203646 | 11/2015 |
| JP | 2018-005832 | 1/2018 |
| JP | 2018-018233 | 2/2018 |

OTHER PUBLICATIONS

Notification of Reasons for Refusal dated May 12, 2020 in Japanese Patent Application No. 2018-073778.
Notification of Reasons for Refusal issued in the JP Patent Application No. 2018-073778, dated Sep. 1, 2020.
Decision of Refusal, including Decision of Dismissal of Amendment, dated Jan. 6, 2021 in corresponding Japanese Patent Application No. 2018-073778.

\* cited by examiner

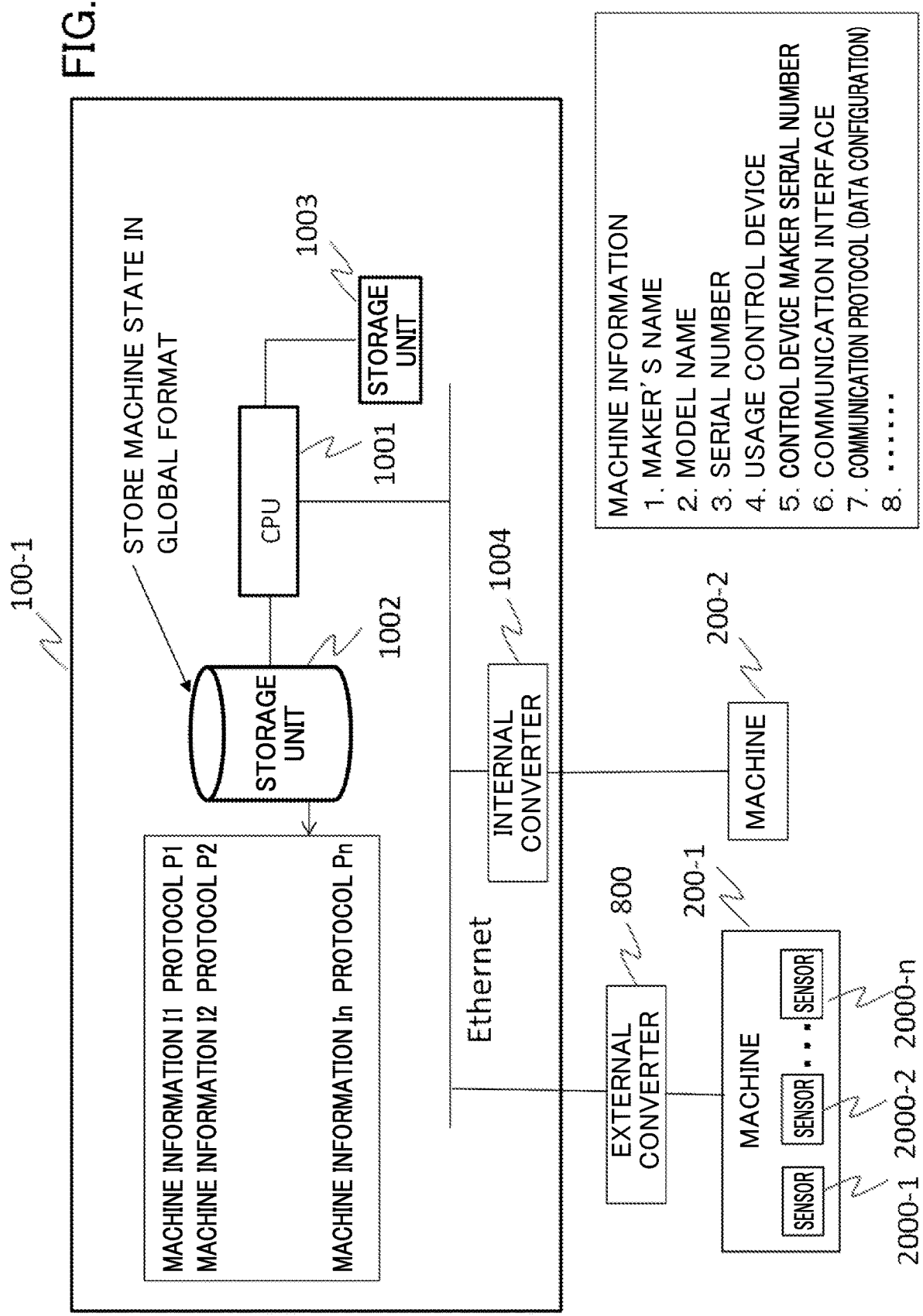

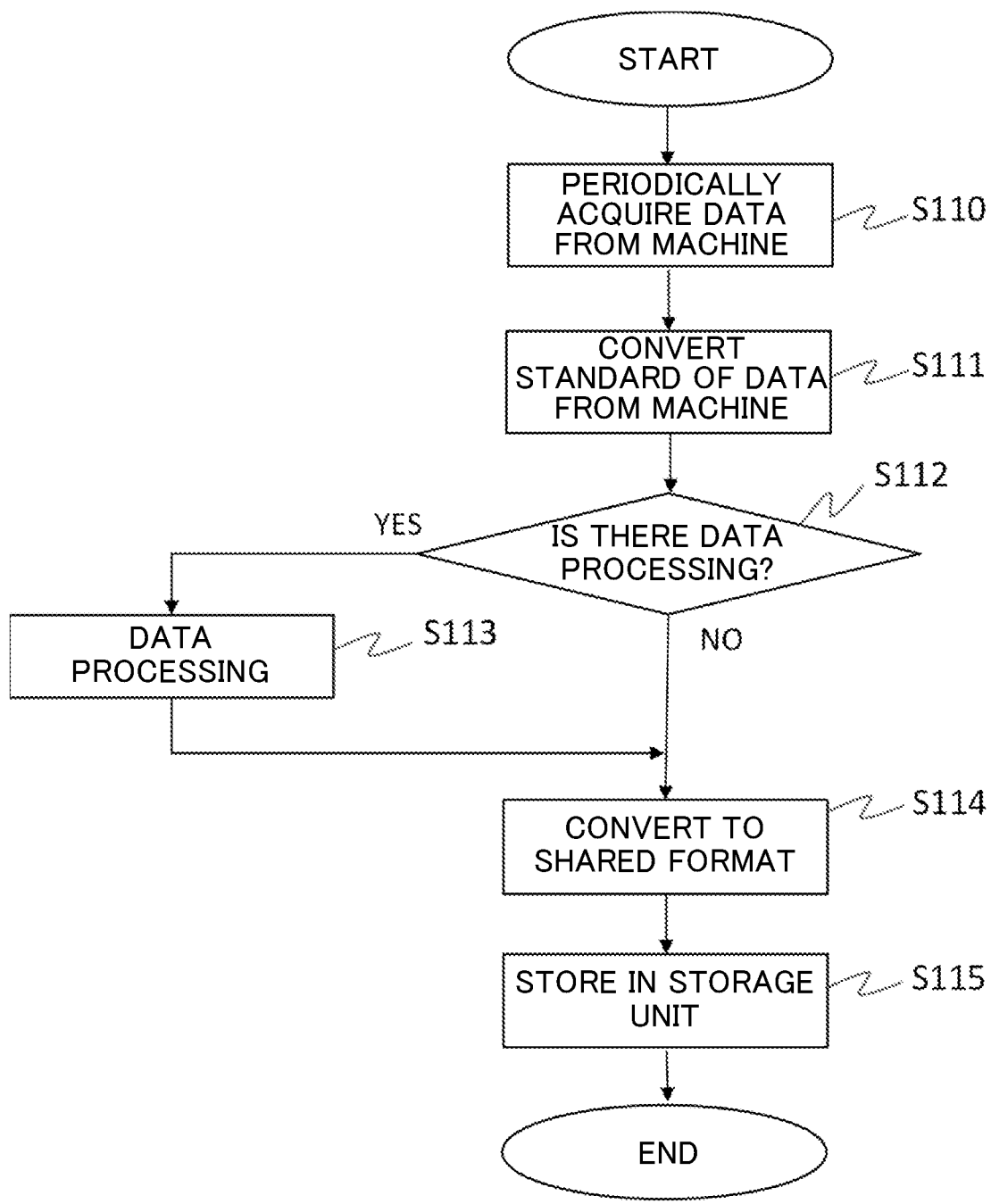

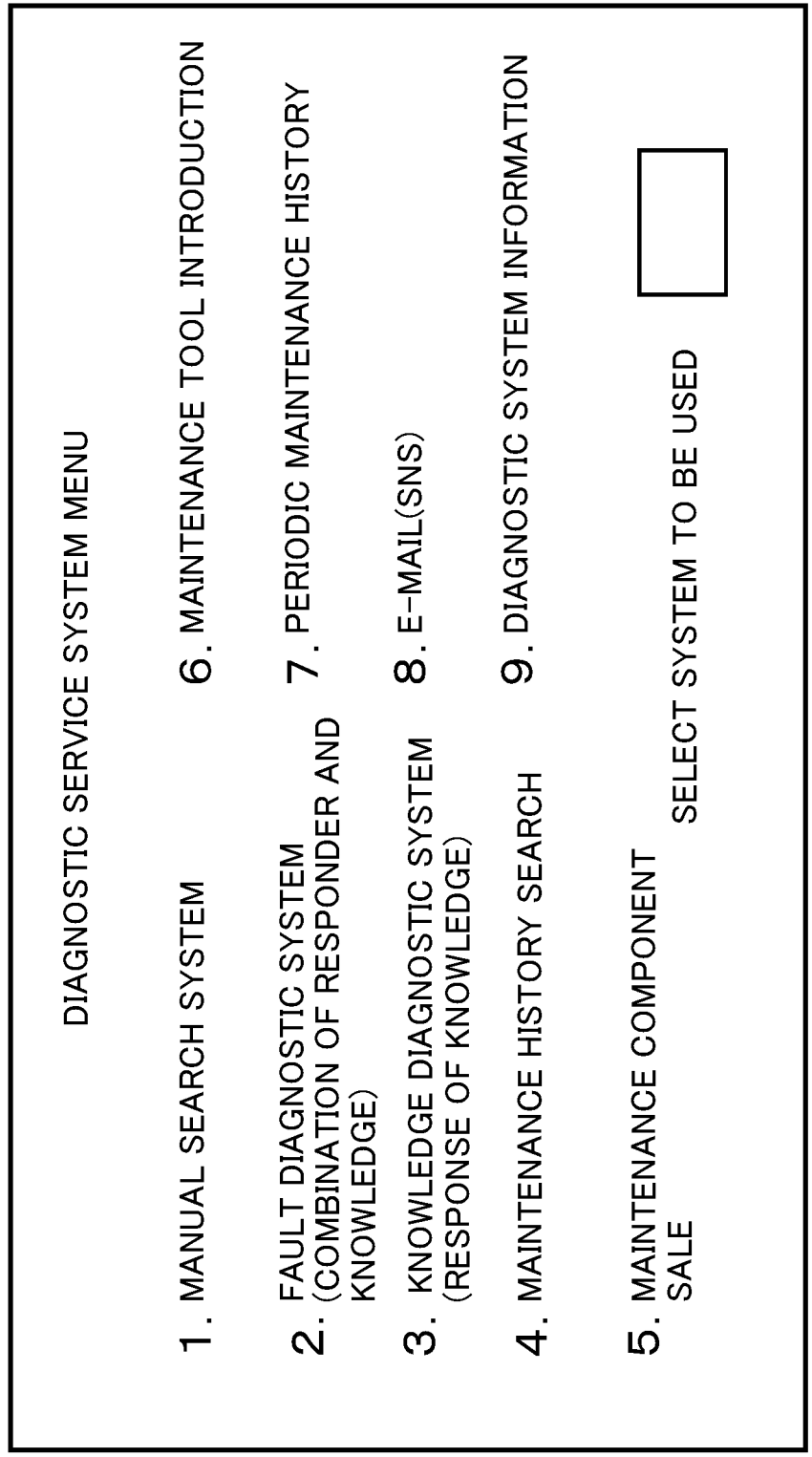

FIG. 8

PLEASE INPUT USER ID

AS1201

PLEASE INPUT PASSWORD

PLEASE CONFIRM COMPANY NAME AND ADDRESS

COMPANY NAME | XX COMPANY

ADDRESS | XX PREFECTURE, XX CITY, XX TOWN

```
9. CONFIRM DIAGNOSTIC SYSTEM INFORMATION

RESPONDER ID1243 : 2016.7.1 09:10

THANK YOU FOR INQUIRY

1. INQUIRY CONTENTS

"ACCELERATED TOOL WEAR, BLADE EDGE CHIPPED"

2. REGARDING HANDLING OF PRESENT CASE

FOLLOWING ITEMS SEARCHED AS FAILURE FACTORS FROM CASE EXAMPLE SEARCH AND VIBRATION
DATA OF CORRESPONDING MACHINE

1) TOOL VIBRATING AND WEAR PROGRESSING, BY DECLINE IN CLAMPING FORCE OF TOOL
2) CORE FLUCTUATION DUE TO WEAR OF SPINDLE SHAFT

DISPATCH OF SERVICE PERSONNEL IS REQUIRED IN REPAIR

MEASUREMENT TOOL  OK

COMPONENT
  BOLT            OK
  SPINDLE SHAFT   OK

SERVICE PERSONNEL  DISPATCHABLE   JULY 1ST  2 PM  CAN DEPART

ESTIMATED COST  XX YEN

PLEASE SELECT ARRANGEMENT IN CASE OF APPROVING DISPATCH
PLEASE CONFIRM ONE HOUR BEFORE DISPATCH
```

[ARRANGE-MENT]    [END]

FIG. 13

EVALUATION OF RESPONSE FROM DIAGNOSTIC SYSTEM

PLEASE INPUT EVALUATION FOR RESPONSE

1. EXCELLENT
2. GOOD
3. NORMAL
4. SLIGHTLY DIFFICULT
5. IMPROVEMENT NEEDED

FIG. 18

```
DIAGNOSIS REQUEST(HISTORY SEARCH)

USER NAME  XX COMPANY
MACHINE NUMBER 20  MACHINE MODEL ****

1. 2016.5.10  SPINDLE VIBRATION

PAST DISPLAY  [ 1 ]  YEAR
```

FIG. 19

```
DIAGNOSIS REQUEST(KEYWORD SEARCH)

KEYWORD       [ TOOL WEAR ]

RECEPTION DATE AND TIME   CONTENTS     SOLVED
1.  2016.3.10                 TOOL WEAR      O

[ END ]       NUMBER [  ]        [ SELECT ]
```

FIG. 20

DIAGNOSIS REQUEST(KNOWLEDGE)

| RECEPTION DATE AND TIME | CONTENTS | SOLVED |
|---|---|---|
| 1. 2016.3.10 | TOOL WEAR | O |
| 2. 2015.9.10 | TOOL WEAR OF EDGE | O |
| 3. 2011.1.10 | TOOL VIBRATING | O |

NUMBER ☐  [SELECT]

FIG. 21

DIAGNOSIS REQUEST(SENSOR)

MAXIMUM VIBRATION VALUE IN THIS PERIOD    20.0m/S2
MACHINE SPECIFICATIONS    05,0m/S2

MAXIMUM VIBRATION AMPLITUDE IN THIS PERIOD    0.03mm
MACHINE SPECIFICATIONS    0.01mm

DATA DISPLAY PERIOD

START   2016.5.1, 20:00 — 2016.7.1, 3:00

[END]    [EXECUTE]

FIG. 22

```
DIAGNOSIS REQUEST(COMPONENT SEARCH)

MEASUREMENT TOOL      ON

COMPONENT
   BOLT               ON
   SPINDLE SHAFT      ON
```

FIG. 23

```
DIAGNOSIS REQUEST(SERVICEMAN)

DISPATCHABLE SERVICEMAN

1.  AAAAA             10:00—
2.  BBBBB             10:00—
```

FIG. 25

| DATE | | | ALARM CONTENTS |
|---|---|---|---|
| 2018 | FEB. 17 | 20:15.0 | DOOR SWITCH ALARM |
| 2018 | JAN. 15 | 10:20.3 | DOOR SWITCH ALARM |
| 2018 | JAN. 2 | 20:16.8 | BATTERY DECLINE(CNC) |
| 2017 | DEC. 4 | 15:12.9 | X-AXIS OVERLOAD |
| 2017 | OCT. 3 | 13:01.8 | BATTERY DECLINE(CNC) |
| 2017 | SEPT. 4 | 03:25.3 | X-AXIS OVERLOAD |
| 2017 | AUG. 6 | 09:56.8 | FAN STOP OF CONTROL DEVICE |
| 2017 | JUL. 6 | 10:28.4 | FAN ALARM (X AXIS) |
| 2017 | JUN. 3 | 22:07.0 | DOOR SWITCH ALARM |
| 2017 | MAR. 2 | 23:21.3 | X-AXIS OVERLOAD |
| 2017 | JAN. 4 | 07:03.5 | FAN ALARM (X AXIS) |
| 2017 | ~ | ~ | |
| 2017 | ~ | ~ | |
| 2017 | ~ | ~ | |
| 2017 | ~ | ~ | |
| 2017 | ~ | ~ | |
| 2017 | ~ | ~ | |
| 2017 | ~ | ~ | |
| 2017 | ~ | ~ | |

FIG. 26

|  | CURRENT VALUE | OPERATING STATUS |
|---|---|---|
| CONTROL DEVICE FAN | 90% | NORMAL |
| X-AXIS FAN | 95% | NORMAL |
| Y-AXIS FAN | 89% | NORMAL |
| Z-AXIS FAN | 88% | NORMAL |
| X-AXIS AMPLIFIER FAN | 99% | NORMAL |
| Y-AXIS AMPLIFIER FAN | 98% | NORMAL |
| Z-AXIS AMPLIFIER FAN | 96% | NORMAL |
|  |  |  |
| BATTERY(CNC) | 89% | NORMAL |
| BATTERY(DETECTOR) | 88% | NORMAL |
| BATTERY(AMPLIFIER) | 99% | NORMAL |
|  |  |  |
| CONTROL DEVICE TEMPERATURE |  |  |
| X-AXIS TEMPERATURE | 60°C | NORMAL |
| Y-AXIS TEMPERATURE | 50°C | NORMAL |
| Z-AXIS TEMPERATURE | 66°C | NORMAL |
| X-AXIS AMPLIFIER TEMPERATURE | 80°C | NORMAL |
| Y-AXIS AMPLIFIER TEMPERATURE | 70°C | NORMAL |
| Z-AXIS AMPLIFIER TEMPERATURE | 75°C | NORMAL |
|  |  |  |
| X-AXIS MAXIMUM LOAD TORQUE | 89% | NORMAL |
| Y-AXIS MAXIMUM LOAD TORQUE | 88% | NORMAL |
| Z-AXIS MAXIMUM LOAD TORQUE | 99% | NORMAL |
| ~ | ~ | ~ |
| ~ | ~ | ~ |
| ~ | ~ | ~ |

FIG. 27

MACHINE NUMBER 4   LAST BATTERY REPLACEMENT(JAN 14, 2016)

CURRENT STATUS   NORMAL

OCT 3, 2017   BATTERY DECLINE (CNC) OCCURRED

JAN 2, 2018   BATTERY DECLINE (CNC) OCCURRED

PLEASE REPLACE BATTERY (CNC)

DIAGNOSTIC SERVICE SYSTEM AND DIAGNOSTIC METHOD USING NETWORK

This application is based on and claims the benefit of priority from Japanese Patent Application No. 2018-073778, filed on 6 Apr. 2018, the content of which is incorporated herein by reference.

BACKGROUND OF THE INVENTION

Field of the Invention

The present invention relates to a diagnostic service system and diagnostic method using a network.

Related Art

As a representative configuration example of a conventional diagnostic service system using a network, there are the three systems shown in FIGS. 1A, 1B and 1C. In the system shown in FIG. 1A, machines 11, 12 and 13 send an operating status directly, or through a network, to a diagnosis center 20, and perform fault diagnosis by considering the status of the machines 11, 12 and 13. As patent documents describing this system, there are Patent Documents 1, 2 and 3, for example. In the system shown in FIG. 1B, a management device 30 monitors the operating status of the machines 11, 12 and 13, and the diagnosis center 20 performs diagnosis by also considering log data accumulated in the management device 30 during alarm. As a patent document describing this system, there is Patent Document 4. In the system shown in FIG. 1C, this system has a management device 31 including an inquiry system, and a diagnosis center 21 including an inquiry system, an interview system is embedded in the management device 31, and the diagnosis center 21 performs diagnosis in accordance with status information made using this interview system and the log data accumulated in the management system 31, during alarm occurrence. As patent documents describing this system, there are Patent Documents 5 and 6, for example.

Patent Document 1: Japanese Unexamined Patent Application, Publication No. H10-228311
Patent Document 2: Japanese Unexamined Patent Application, Publication No. H05-284573
Patent Document 3: Japanese Unexamined Patent Application, Publication No. H11-119815
Patent Document 4: Japanese Unexamined Patent Application, Publication No. H10-222220
Patent Document 5: Japanese Unexamined Patent Application, Publication No. H05-11834
Patent Document 6: Japanese Unexamined Patent Application, Publication No. 2001-236115

SUMMARY OF THE INVENTION

The conventional system can rapidly perform grasping of failure contents due to being able to use actual machine operation data or history data during analysis of fault contents during alarm occurrence. On the other hand, depending on the contents of the failure during alarm occurrence, there are cases where a machine becomes operable by the operator resetting this alarm, and as a result thereof, the alarm ceasing, or cases where, after alarm occurrence, the failure related to this alarm automatically recovers after the elapse of a predetermined time (for example, case of a predetermined operation of this machine having continued for a predetermined time), and as a result thereof, the alarm ceasing. However, supposing that the appropriate maintenance cannot be performed on a machine for which an alarm occurred in the past, there is also a possibility of a serious obstacle occurring. In this way, although an alarm may have occurred in the past, it is necessary to perform appropriate analysis on a machine for which an alarm is not occurring at the present moment, and provide the appropriate maintenance (e.g., preventative maintenance).

In this regard, with the conventional system, the history data including past alarm data of a machine, operating state data, etc. and the current state data are treated separately from each other, and it has not been possible to judge both of these comprehensively, for example, provide a function of performing diagnosis of preventative maintenance, etc., and monitoring. In addition, in the case of there being a plurality of machines having different specifications within a factory, the respective shared events are found from the data transmitted from each machine, and it has been very difficult to judge the past history data and current state data comprehensively, and diagnose the status of each machine in a short time.

In order to solve the above such problems, the present invention has the object of providing, in regards to a diagnostic service system using a network, a diagnostic service system and diagnostic method which make it possible to monitor the status of each machine and comprehensively and efficiently diagnose the maintenance contents necessitated according to the status of each machine, based on past history data and current state data of each machine, and provide information related to these maintenance contents to the user.

A diagnostic service system (for example, the "diagnostic service system 1" described later) according to a first aspect of the present invention includes a factory monitoring system (for example, the "factory monitoring system 100" described later) which includes: a data acquisition unit (for example, the "data acquisition unit 1011" described later) that acquires data related to at least one machine, including time information; and a storage management unit (for example, the "stored data management unit 1012" described later) that stores data related to each machine acquired by the data acquisition unit in a storage unit (for example, the "storage unit 1002" described later) together with identification information of each machine, in which, based on past history data related to the machine and current data related to the machine, the diagnostic service system estimates a possibility of abnormality occurrence in the machine, and provides preventative maintenance information related to the machine.

According to a second aspect of the present invention, in the diagnostic service system as described in the first aspect, it may be configured so that data related to the machine includes alarm data related to a battery included by the machine, and reset data of the alarm data.

According to a third aspect of the present invention, in the diagnostic service system as described in the first or second aspect, it may be configured so that data related to the machine includes alarm data related to a fan motor included by the machine, and ceasing data of the alarm data.

According to a fourth aspect of the present invention, in the diagnostic service system as described in any one of the first to third aspects, it may be configured so that the data related to the machine includes operating data related to a servomotor controller included by the machine, and alarm data related to the servomotor controller.

A diagnostic method according to a fifth aspect of the present invention is executed by at least one computer having a storage unit (for example, the "storage unit 1002" described later), the method including the steps of: acquiring data related to at least one machine, including time information; storing in the storage unit the data related to each machine which was acquired in the step of acquiring, together with identification information of each machine; and estimating a possibility of abnormality occurrence in the machine, and providing preventative maintenance information related to the machine, based on past history data related to the machine, and current data related to the machine.

According to the present invention, a diagnostic service system and a diagnostic method using a network make it possible to monitor the status of each machine and comprehensively and efficiently diagnose the maintenance contents necessitated according to the status of each machine, based on past history data and current state data of each machine, and provide information related to these maintenance contents to the user.

BRIEF DESCRIPTION OF THE DRAWINGS

FIG. 3 is a block diagram showing the configurations of a machine and a factory monitoring system;

FIG. 5 is a flowchart showing operations of a factory monitoring system;

FIG. 7 is a view showing a screen of a diagnostic service system menu;

FIG. 8 is a view showing an authentication screen;

FIG. 12 is a view showing details of a diagnostic system information confirmation screen;

FIG. 13 is a view showing an evaluation information input screen relative to a response from the diagnostic system;

FIG. 18 is a view showing a screen of a history search;

FIG. 19 is a view showing a screen of a keyword search;

FIG. 20 is a view showing a screen of a knowledge search;

FIG. 21 is a view showing a screen of sensor information;

FIG. 22 is a view showing a screen of component information;

FIG. 23 is a view showing a screen of field serviceman information; and

FIG. 25 is a view showing an example of an alarm history display;

FIG. 26 is a view showing an example of current value display of a machine status;

FIG. 27 is a view showing a display example of a scheduled maintenance history screen;

DETAILED DESCRIPTION OF THE INVENTION

Figure 1A:
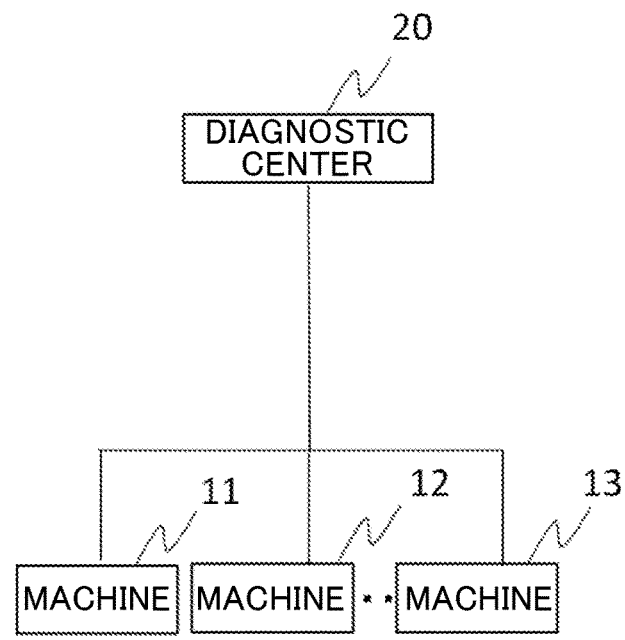
FIG. 1A is a block diagram showing an example of a diagnostic service system including machines and diagnosis center.
Figure 1B:
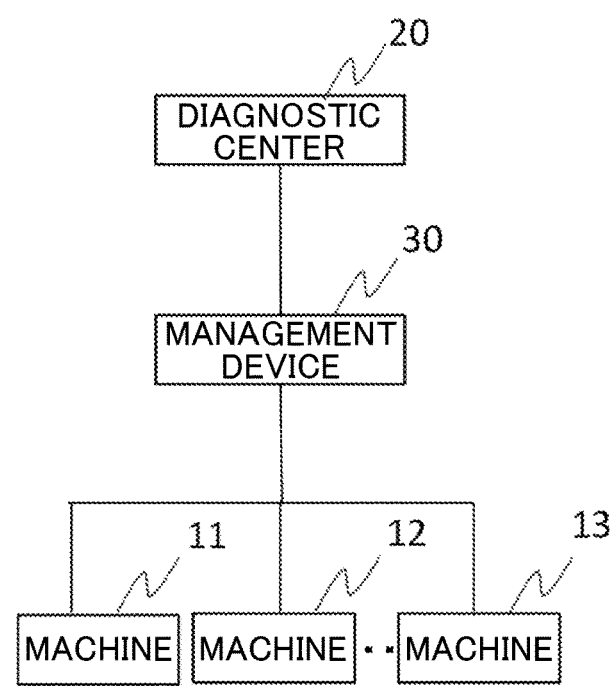
FIG. 1B is a block diagram showing an example of a diagnostic service system including machines, a management device and diagnosis center.
Figure 1C:
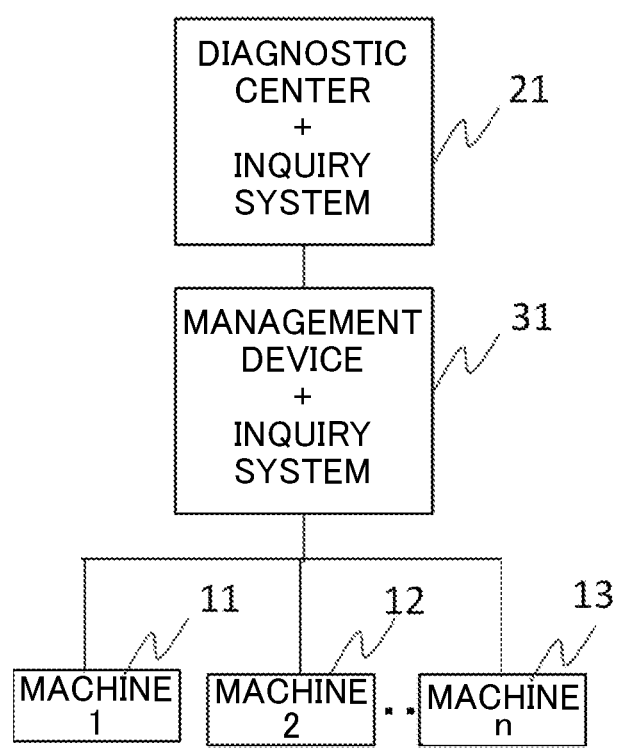
FIG. 1C is a block diagram showing an example of a diagnostic service system including machines, a management device, a diagnosis center and inquiry system.

First, prior to explanation of embodiments of the present invention, the background for arriving at the present invention will be explained taking an example of a diagnostic service system related to failure in a machine tool arranged in a factory. As causes of alarm occurrence in a machine tool having an inquiry from a user, mainly there are the following three patterns (1), (2) and (3).

(1) Cause is a case of being failure of a specific part of the machine tool. For example, a case of wear on a ball screw in the machine tool including a mechanism that converts rotational motion into linear motion by a ball screw, etc. can be exemplified.

(2) Cause is a case of the machine tool machining at more severe machining conditions than the supposed machining conditions (case of appearance seeming to be failure, but not being a failure based on fault, etc. of a specific part of the machine). For example, a case of machining by exceeding the rated torque of the motor can be exemplified.

(3) Cause is a case of wearing of the machine tool (for example, cutting tool, etc.) (case of appearance seeming to be failure, but not being a failure based on fault, etc. of a specific part of the machine).

Then, the handling thereof differs according to the cause of the alarm occurrence. More specifically, in the case of the above-mentioned pattern (1), it is necessary to perform specification of the failed component, and specification such as whether the cause of this alarm occurrence is failure of the control system, or is failure of a maker system (so-called category), etc. By specifying these, it is possible to select and dispatch the most suitable component and most suitable field serviceman.

In the case of the above-mentioned pattern (2), it is possible to resolve the alarm by the user specifying the machining conditions, and reviewing the machining conditions. Therefore, the ordering of components for the machine tool and dispatching of a field serviceman are unnecessary. In the case of the above-mentioned pattern (3), it is possible to resolve the alarm by the user finding the defect in the machining tool, and replacing this machining tool. Therefore, the ordering of components for the machine tool and dispatching of a field serviceman are unnecessary.

In the cases of the above-mentioned patterns (2) and (3), it is preferable to provide an environment in which the user can quickly resolve errors without requiring to dispatch a skilled technician. In addition, in the case of the above-mentioned pattern (1), i.e. in the case of a failure occurring in a specific part of the machine tool, it becomes possible to quickly order the most suitable component and dispatch the most suitable field serviceman.

The patterns of the above (1) to (3) are all cases requiring to obtain an exclusive response for solving an individual event in the case of an alarm having occurred. In contrast, even in a case of an alarm having occurred, there are cases where the alarm ceases without a fault report or inquiry from the user, and without taking an exclusive response for solving the individual event. More specifically, the next pattern can be exemplified.

(4) For example, in the case of an alarm notifying that the remaining amount of battery backing up the RAM memory became no more than a threshold (or consumption degree of battery became at least a threshold), since the remaining amount of battery will not be zero soon, for example, if the user resets the alarm, the alarm will cease, and temporarily become usable; however, there is concern over the user or maintenance worker in other cases not noticing a decline in the remaining amount of battery.

(5) A case can be exemplified of the state of a specific part of a machine tool not being a fault, but the current state showing an abnormal value differing from normal, and returning to the normal state accompanying operation running of the specific part, for example, a case of rotation of the fan motor starting simultaneously with power supply start, and at this time, detecting a state in which the oil mist sticking to the fan adheres. So long as it is not possible to operate, but the power is not turned off during the occurrence of a fan alarm, a machine generally will continue rotation. For this reason, a case of a fan alarm occurring when the temperature is low during operation start, and a case of the rotation of the fan motor being started, and the temperature rising as the fan operates, whereby the oil mist adhering to the fan becomes soft, and the fan motor alarm automatically ceases accompanying time elapse can be exemplified.

The above-mentioned (4) case, if a battery is completely consumed when left as is, there is a possibility of a serious hindrance occurring in that the contents of data stored in the RAM memory disappear. In particular, there is a case of the battery dying during machining operation when operating over a long time. In this case, if outputting an alarm during machining operation, since this machining will fail, it becomes a method in which the alarm is not outputted. For this reason, although it becomes necessary to replace the battery prior to shutting off the power supply after machining end, the fact that a battery alarm occurred prior to machining may be forgotten, and as a result thereof, a significant hindrance in that the contents of data stored in the RAM memory disappears may occur. For this reason, for such an alarm, it becomes necessary to diagnose the maintenance contents which were necessitated based on the past alarm history of the battery and the current state data, and recommend information related to these maintenance contents (so-called preventative maintenance) to the user.

Even in the above case (5), if the operator continues operation running as is, there is a possibility of the oil mist adhered to the fan being accumulated, and the rotation speed of the fan declining. There is a possibility of the cooling performance of the fan thereby declining, and a problem occurring such as overheating of the motor and overheating of the servo amplifier, for example. For this reason, even for such an alarm, it becomes necessary to diagnose the maintenance contents which were necessitated based on the past alarm history of the fan motor and the current state data, and recommend information related to these maintenance contents (so-called preventative maintenance) to the user.

In the case of the alarm exemplified in (1) to (3) occurring, for example, in a machine tool arranged within the factory of a user in this way, in order to quickly ascertain the cause of the alarm occurrence, it is important to provide an integrated system (hereinafter also referred to as "diagnostic service system") that can make the appropriate measures based on the cause of the alarm occurrence. In addition, in the case of the alarm exemplified in (4) or (5) occurring, for example, in a machine tool arranged within the factory of a user, it is important to provide a diagnostic service system which can always monitor past history data and current state data in each machine, by storing the alarm contents thereof in a centralized manner, diagnose the maintenance contents which were necessitated based on the past history data and current state data, and recommend information related to these maintenance contents (so-called preventative maintenance) to the user. For this reason, in the diagnostic service system, a factory monitoring system is important that continually collects centrally the data relating to the machines of a plurality of makers installed in the factory every predetermined period, and can store and manage the data so as to be able to effectively utilize the stored data as necessary. Similarly, in a diagnostic service system, a factory monitoring system is important which can continuously collect alarm data related to the machines of a plurality of manufacturers installed in a factory at every predetermined period in a centralized manner, and comprehensively monitor the stored alarm data and current state data, and storage and manage the alarm history data so as to be able to judge the states of machines in a short time. In this case, also for the resetting of alarms such as those explained in (4) and (5), the automatic ceasing of alarms, etc., it is preferable to store in a centralized manner as maintenance history and make available.

By providing a factory monitoring system, it becomes possible to guess the cause of the alarm occurrence in the following way, in the case of a machine tool including a mechanism that converts rotational motion into linear motion by the aforementioned ball screw, etc. In the case of the above-mentioned pattern (1), for the case of wear of the ball screw, the status of a used stroke of the ball screw and load status are established from the characteristic diagram of FIG. 6B described later, based on the information stored and managed in the factory monitoring system. By comparing this data with the data of a case of operating the full stroke in delivery inspection at the factory, for example, it is possible to guess the wear state of a specific part in the ball screw.

In the case of the above-mentioned pattern (2), in the case of machining by exceeding the rated torque of a motor, for example, the factory monitoring system is configured so as to store, at fixed intervals, the machine doing machining and machining program, the motor command speed, motor current, and information of various sensors during machining, for all machining. By doing this, it is possible to grasp the status of machining that exceeds the rated torque of the motor in which the motor current is being used during machining, from the relationship between the command speed and motor current during factory delivery, and the relationship between command speed and motor current during machining. It is possible to grasp the motor being used from recording during delivery.

Figure 24:
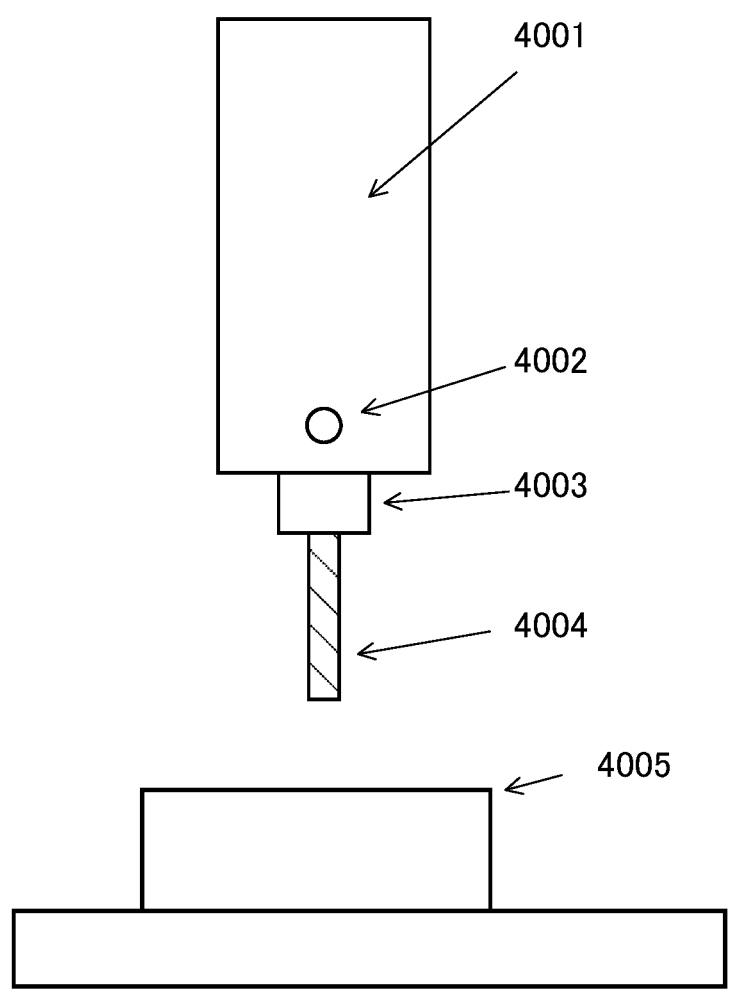
FIG. 24 is a view showing an example of a machine tool.

In the case of the above-mentioned pattern (3), in a machine such as that in FIG. 24 described later, for example, the factory monitoring system is configured so as to store, at fixed intervals, the vibrations during machining by equipping vibration sensors at locations that can detect the status of the machining tool, in addition to the machine doing machining and machining program, and motor command speed, motor current and information of various sensors, during machining. By doing this, the factory monitoring system can compare the vibrations during machining with thresholds. More specifically, the factory monitoring system, by comparing between a waveform when machining without trouble in the past and the current waveform, for example, can compare at higher frequency than comparing with a threshold created with a sample of small N value, and is able to guess the wear of the machining tool.

Figure 28:
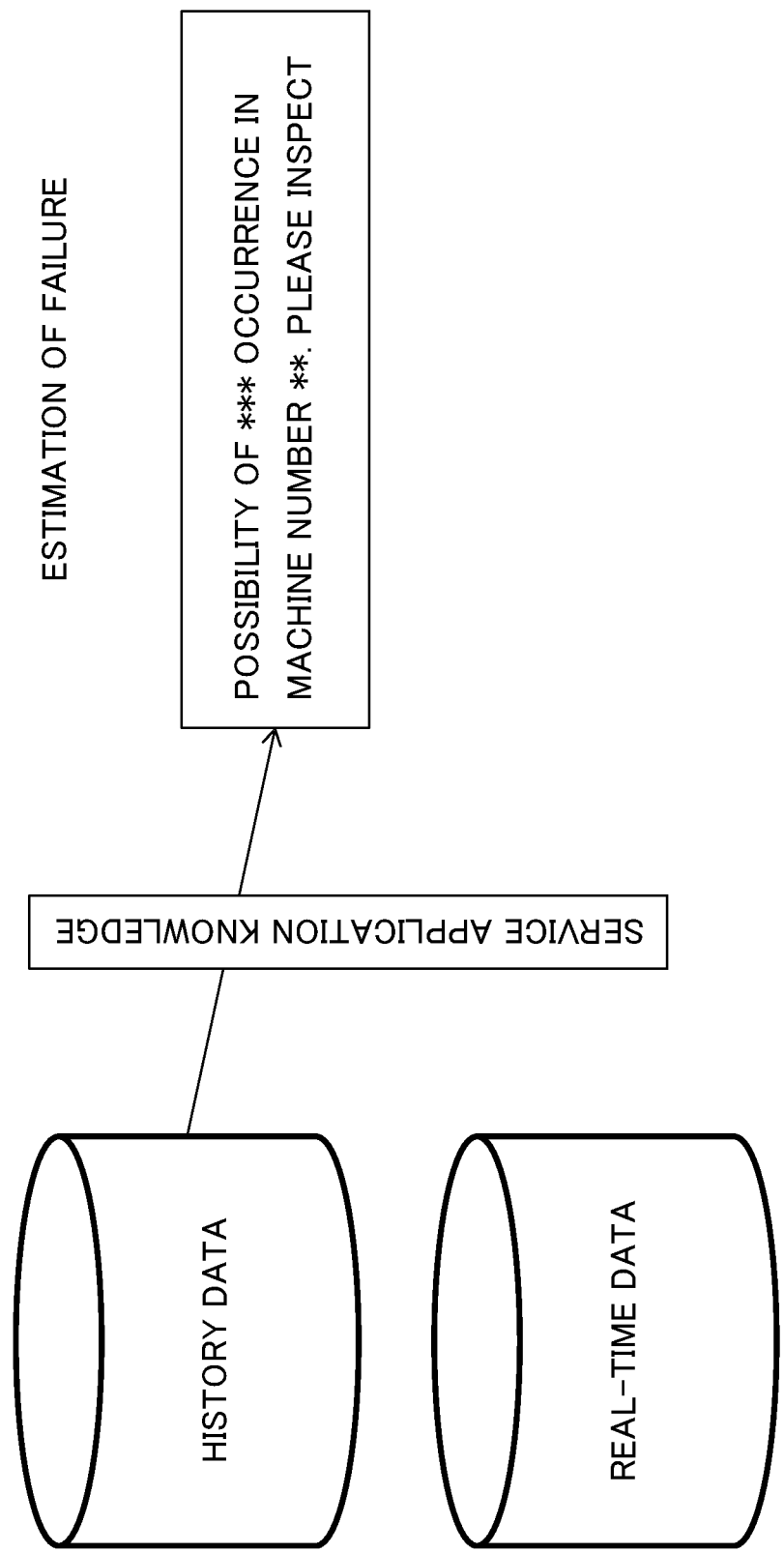
FIG. 28 is a view showing a display screen example estimating a possibility of the occurrence of failure of a machine.

It should be noted that, although the above-mentioned (1) to (3) explain the contents of a diagnostic service when an alarm occurred during operation of a machine, it becomes possible to diagnose the possibility of a future failure occurring (for example, probability) and preventative maintenance contents which were necessitated, based on the history data related to the operating state of a machine and the current state data of the machine, also when an alarm is not occurring during operation of the machine, and recommend information related to these preventative maintenance contents to the user. More specifically, for example, it is possible to learn the correlation between history data and failure occurrence of the machine using the history data, for example, create a learning model thereof (knowledge database), and diagnose the current state data of the machine based on this learning model (knowledge database). As shown in FIG. 28, it thereby becomes possible to diagnose the possibility of future failure occurrence (for example, probability) and the preventative maintenance contents which were necessitated, and provide the diagnosis results to the user.

In addition, in the case of the above-mentioned (4) and (5), by storing past alarm data having occurred in each machine in a centralized manner as shown in FIG. 25, for every machine installed within the factory of the user, and acquiring the current state data of the machine as shown in FIG. 26, it becomes possible to always monitor the past alarm history and current state data for every machine, diagnose the maintenance contents which were necessitated based on the past alarm history and current state data, and recommend information related to these maintenance contents (so-called preventative maintenance) to the user as shown in FIG. 27.

Figure 29:
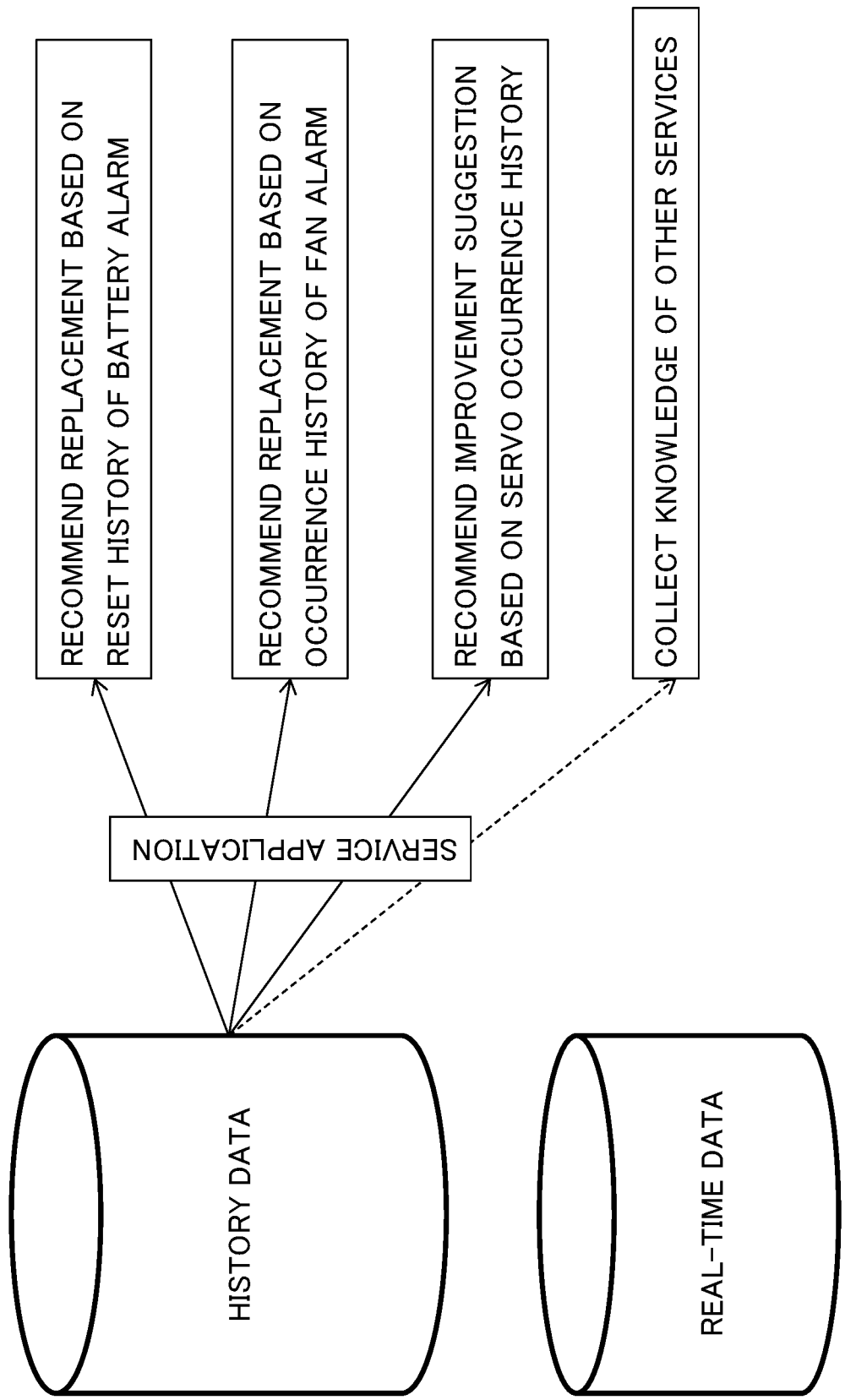
FIG. 29 is a view showing an example of preventative maintenance recommended with history data.

In the above way, according to the present invention, it is possible to monitor the status of each machine based on the past history data and current state data of each machine as shown in FIG. 29, as well as comprehensively and efficiently diagnose the maintenance contents which were necessitated in response to the status of each machine, and provide information related to these maintenance contents to the user.

Figure 2A:
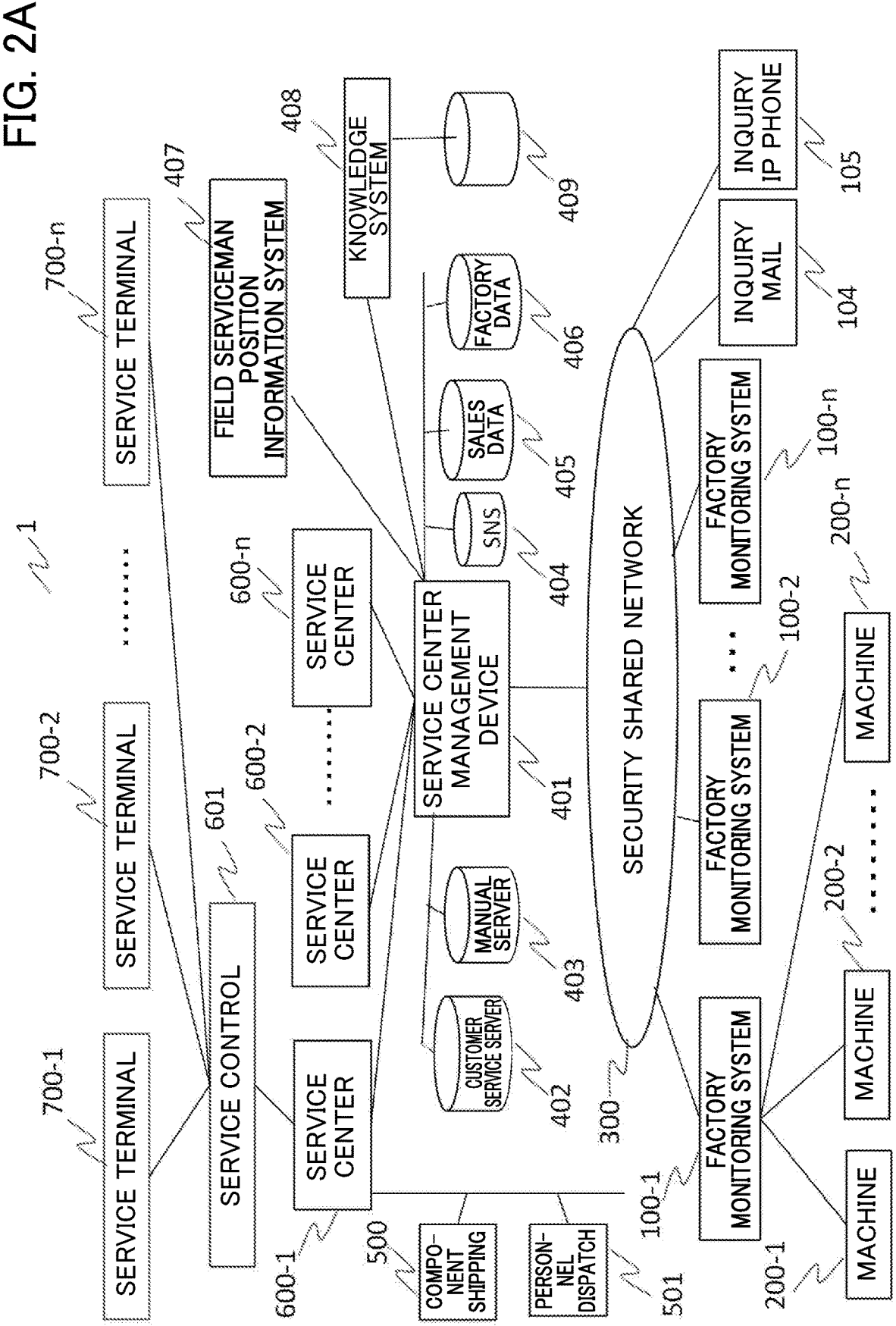
FIG. 2A is a block diagram showing the configuration of an embodiment of a diagnostic service system according to the present invention.
Figure 4:
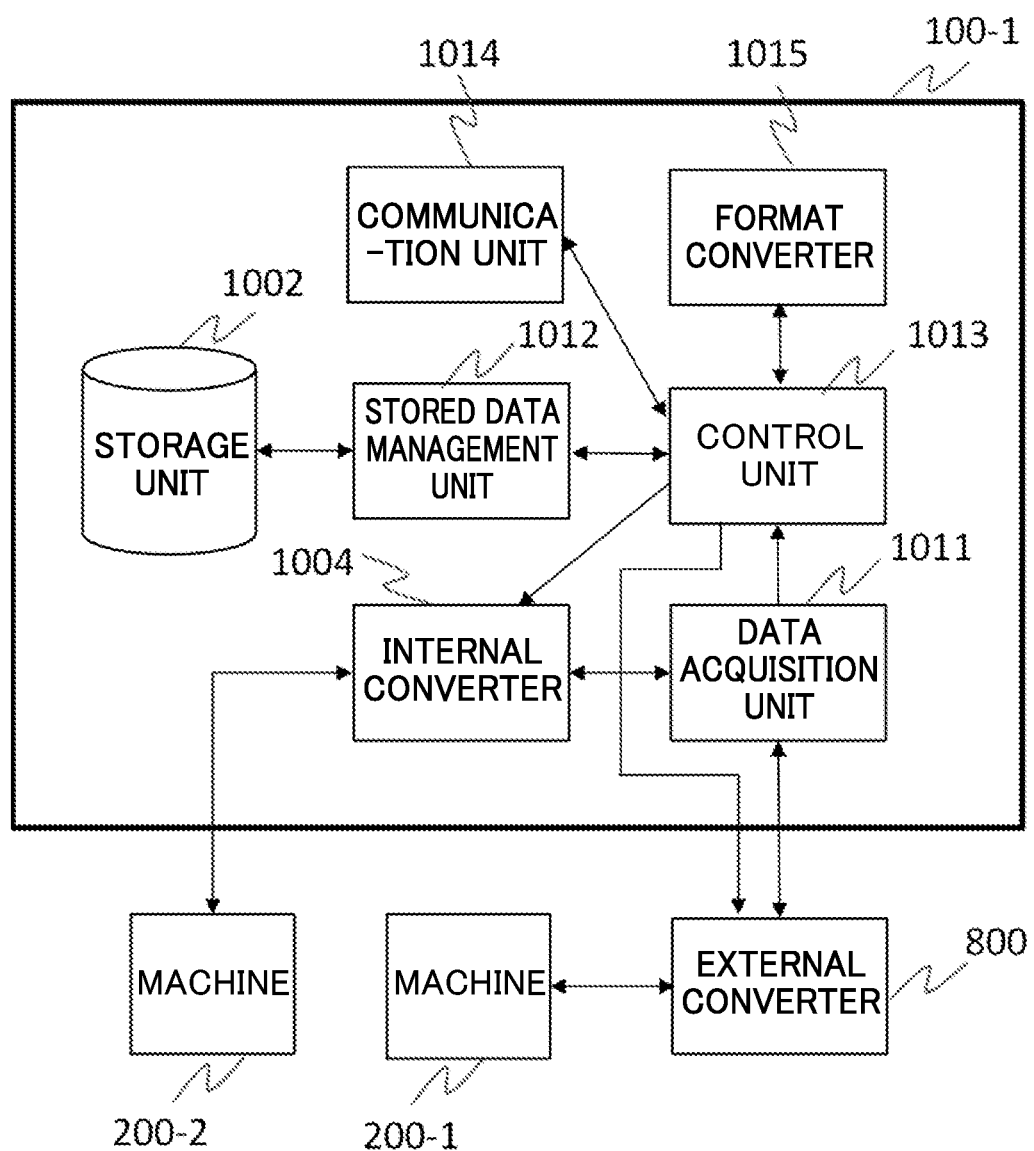
FIG. 4 is a block diagram showing the configurations of a machine and a factory monitoring system.
Figure 6A:
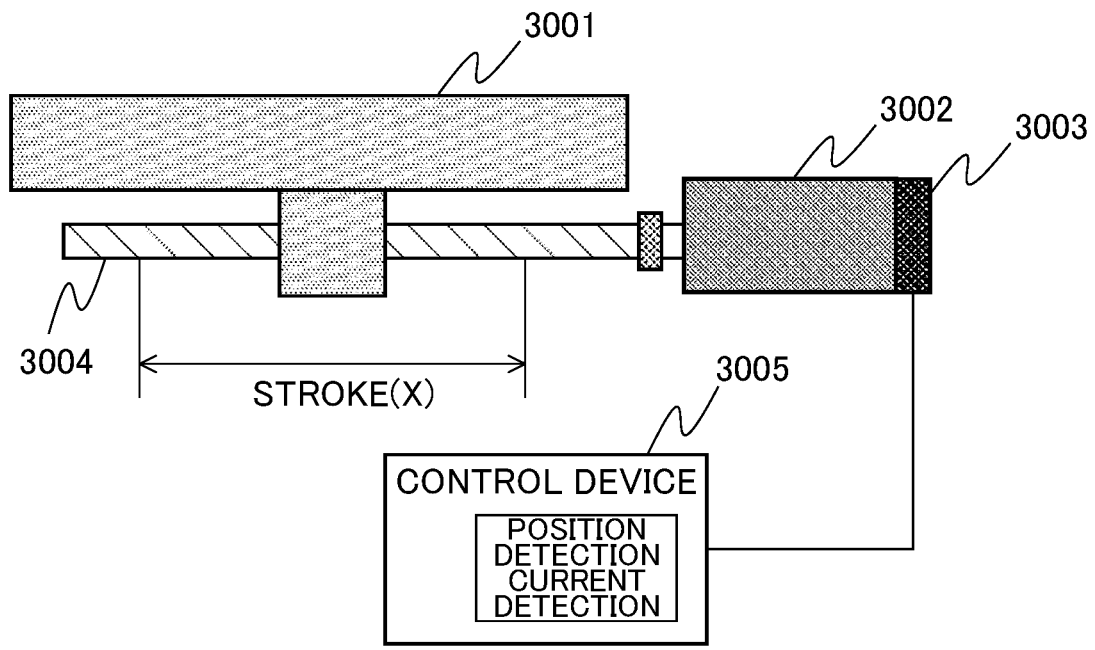
FIG. 6A is an explanatory diagram showing an outline of a machine tool including a mechanism that converts rotational motion into linear motion.
Figure 6B:
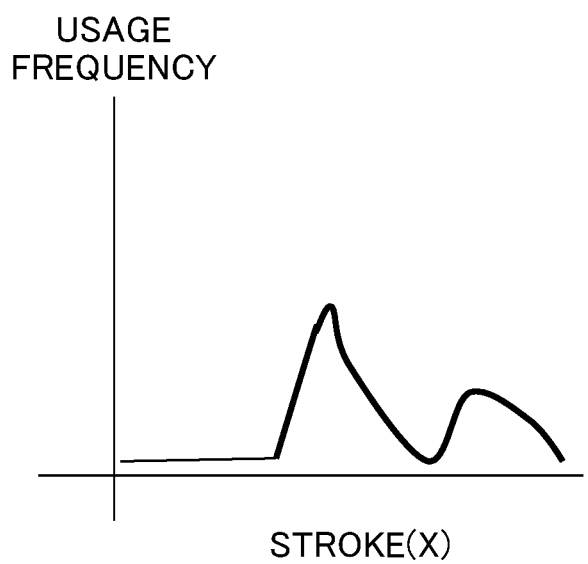
FIG. 6B is a characteristic diagram showing the relationship between use frequency and stroke.
Figure 6C:
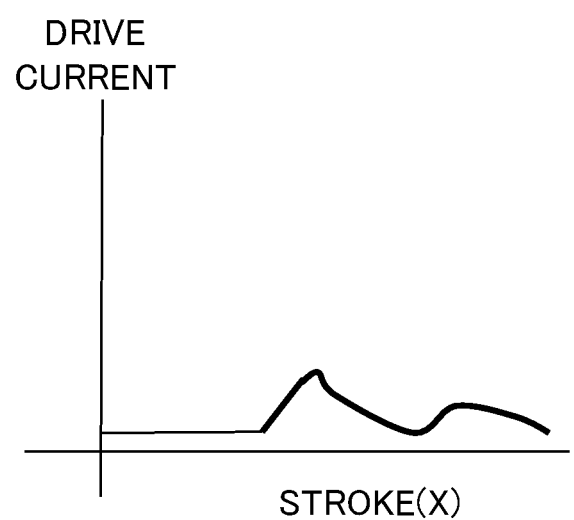
FIG. 6C is a characteristic diagram showing the relationship between drive current and stroke.

The present invention has been made based on such a demand, and hereinafter, the present invention will be explained in detail based on embodiments. Hereinafter, an embodiment of the present invention will be explained in detail using the drawings. The embodiment explained hereinafter explains an example using a machine such as a machine tool including an injection molding machine, cutting machine, electric discharge machine and robot, as the machine. FIG. 2A is a block diagram showing the configuration of the embodiment of a diagnostic service system according to the present invention. FIGS. 3 and 4 are block diagrams showing the configurations of a machine and factory monitoring system. FIG. 5 is a flowchart showing operations of the factory monitoring system. FIG. 6A is an explanatory diagram showing an outline of a machine tool including a mechanism that converts rotational motion into linear motion. FIG. 6B is a characteristic diagram showing the distribution of disturbance load torque. FIG. 6C is an explanatory diagram for explaining uneven wear detection of a ball screw. It should be noted that n used in the following explanation indicates a positive integer of at least 1, unless specifically stated as being plural. Although the number of machines, number of factory monitoring systems, number of service centers, and number of service terminals are all indicated by n, unless specifically stated as being the same number in the following explanation, it is possible to arbitrarily set each of the number of machines, number of factory monitoring systems, number of service centers, and number of service terminals.

<Overall Configuration of Diagnostic Service System 1>

The overall configuration of a diagnostic service system 1 will be explained using FIG. 2A. As shown in FIG. 2A, a service center management device 401 is connected with at least one factory monitoring system 100 via a security shared network 300, and is connected to at least one service center 600 via a network. Each of the at least one factory monitoring system 100 is connected to at least one machine via a network. FIG. 2A shows that the factory monitoring system 100 consists of a plurality of factory monitoring systems 100-1, 100-2, . . . , 100-*n*, and the factory monitoring system 100-1 is connected to several machines 200-1, 200-2, . . . , 200-*n*.

At least one service terminal 700 is connected to each of the at least one service center 600 by a network via a service control 601. In FIG. 2A, the service center 600 consists of a plurality of service centers 600-1, 600-2, . . . , 600-*n*, and each service center 600 is connected to a plurality of service terminals 700-1, 700-2, . . . , 700-*n* by a network via the service control 601. The service control 601 may be realized as a function within the service center 600.

In the case of a failure occurring in a machine installed in the factory, it is possible to request fault diagnosis and a solution thereof to the service center 600 via the service center management device 401 by the user inputting an interview sheet via the factory monitoring system 100. In addition, the user can request fault diagnosis and a solution thereof to the service center 600 by sending an inquiry mail 104 via a personal computer, smartphone, portable telephone, etc. to the service center management device 401, or calling using an inquiry IP phone 105. More specifically, instead of the user inputting an interview sheet, by an operator at the service center 600 inputting an interview sheet based on report contents acquired via an inquiry mail 104 or inquiry IP phone 105, it is possible to request fault diagnosis and a solution thereof to the service center 600.

The service center management device 401 is connected with a customer service server 402, manual server 403, social network system (SNS) 404, sales data server 405, factory data server 406, field serviceman position information system 407, and knowledge system 408. The knowledge system 408 is connected to a failure know-how database 409. Each of the service centers 600 is connected with a component shipping center 500, and a personnel dispatch center 501. FIG. 2A shows a case of the service center 600-1 being connected to the component shipping center 500 and personnel dispatch center 501. It should be noted that the above nodes could be respectively connected directly via a connection interface, or respectively connected via the network, to be able to mutually perform communication. It should be noted that the network, for example, is a LAN constructed within a factory, Internet, public telephone network, or a combination of these. The specific communication system of the network, whether being a wired connection or wireless connection, etc., is not particularly limited.

In this way, the service center management device 401 can quickly perform personnel dispatch scheduling for component replacement or repair and adjustment, after managing component status and personnel data, and fault diagnosis has completed, via the service center 600.

Each service center 600 can be established as a service center arranged globally (worldwide). For example, the service center 600-1 is arranged in Tokyo, the service center 600-2 is arranged in New York, and the service center 600-3 is arranged in Beijing. By doing this, it may be configured so as to prioritize the service center arranged in the region corresponding to the location of the factory. It may be configured so that an inquiry of a fault (interview sheet) transmitted to the service center management device 401 is transmitted by the service control 601 to the service terminal 700 of a responder having the least inquiry work on hand. In addition, it may be configured so that the responder designated by the user is selected by the user designating a responder ID. FIG. 2A shows the matter of the service center 600 being connected to the service control 601, and the service control 601 being connected to the plurality of service terminals 700-1, 700-2, . . . , 700-n. An inquiry of a fault transmitted to the service center management device 401 is transmitted to the service terminal (for example, service terminal 700-1) of a responder having the least inquiry work on hand.

<Configuration and Operation of Machine and Factory Monitoring System>

It is configured so that each user and service worker interchange a maintenance contract related to maintenance of each machine in a factory and, for example, in this maintenance contract, there is an emergency repair contract (unscheduled contract) for perform repair in the case of a failure occurring, and other than emergency repair, a preventative maintenance contract (scheduled contract) for performing preventative maintenance by replacing parts for which abnormality occurrence is estimated, life-limited components, consumable components, etc., by storing alarm history data which occurred in the past including alarm data, alarms reset during alarm occurrence, alarms ceased by continuing operation running after alarm occurrence, etc. as mentioned earlier, thereby always comprehensively monitoring past alarm data of every machine and current machine state of every machine, whereby the possibility of abnormality occurrence of each machine is estimated, and maintenance information related to preventative maintenance is provided. The maintenance contract between each user and service worker can be performed at each factory site, and a factory monitoring system for monitoring each machine of the factory is provided at each factory. The factory may be located globally (worldwide). For this reason, the factory monitoring system is configured so as to acquire information from any machine, and convert the acquired information into a shared format established in advance ("referred to as "global format").

In addition, premised on a case such as performing fault diagnosis in the diagnostic service system 1, each factory monitoring system 100 is required to store data of the machine 200. Machine tools are often used for a long period of time (for example, on the order of 35 years) in the factory of the user. Due to premising on the machine tool using the products of any manufacturer, it is important to be able to rapidly acquire a manual related to the machine, maintenance history, operation information produced from operating at the factory of the user from the moment of shipping this machine from the factory of the manufacturer, the aforementioned alarm data, etc., based in the machine number. As ways of using the machine tool, there are cases of conducting continuous production (for example, producing the same product continuously 24 hours), and cases of performing intermittent production. In particular, when an alarm occurs in the case of performing intermittent production, it is desired to know exactly the history such as what kind of processing was done as a response to the alarm, and when operating a previous time.

The machine tool does not always apply the same parameters, and often corrects the previously applied parameters to apply. For this reason, it is demanded that the factory monitoring system 100 collects and manages information (data) related to each machine tool, and establishes a state allowing to immediately reference this information during alarm occurrence, etc. In addition, not limited to during alarm occurrence, it is demanded to periodically diagnose the necessitated maintenance contents for every machine, based on past alarm history data for every machine and the current machine state for every machine, and recommend to the user information related to these maintenance contents (so-called preventative maintenance). Herein, in addition to the machine information of FIG. 3 described later, the following such information can be exemplified as the information related to the machine tool.

(a) Operating State of Machine

Information of the operating state of the machine is a machining program, motor command speed, motor current and information of various sensors during machining, for example. In particular, information in the case of an injection molding machine, for example, is a shot number since operation start, maximum current value of the motor driving the injection screw during injection, maximum current value of the motor driving a clamping mechanism during mold clamping, maximum current value of the motor driving the ejector shaft, maximum current value during measurement of the motor rotationally driving the screw, peak injection pressure, current cycle time of 1 molding cycle, measured time, injection time, and alarm codes, etc.

(b) Operating State Transition

Information of an operating state transition is a temporal change in the above-mentioned operating state, for example.

(c) Fault History

Information of fault history is the respective data of previously occurring alarm contents, occurrence time, repair completion time, fault repair contents, etc., for example.

(d) Maintenance History

Information of maintenance history is the periodic inspection contents and implementation period, replaced consumable components and lifespan components, replacement period, etc., for example.

(e) Production Management Information

The information of the production management information is total operating time, and total stroke number (slide machining number).

(f) Other than Failure History, for Example, Past Alarm Occurrence History Including Alarm Data Occurring in Every Machine Such as that Shown in FIG. 25 (Alarm Contents, Occurrence Time, Etc.)

It should be noted that, as the information attached to the alarm data, it is preferable to collectively gather alarm response history data such as an alarm which was reset by an operator during alarm occurrence, and alarm which ceased by continuing operation running after alarm occurrence, then storing in a centralized manner as maintenance history, and making available.

(g) Machine State Shown in FIG. 26, for Example, at Present of the Machine.

<Factory Monitoring System 100>

Hereinafter, a control device constituting the factory monitoring system 100 of the diagnostic service system 1 of the present invention will be explained. Hereinafter, unless otherwise mentioned, the control device constituting the factory monitoring system will be referred to simply as "factory monitoring system". FIG. 3 is a block diagram for realizing operation of the factory monitoring system 100 by software, and FIG. 4 shows functions thereof by blocks. Each part shown in FIG. 4 may be constituted by software or may be configured by hardware. In FIG. 3, the factory monitoring system 100 includes a CPU 1001, a storage unit 1003 that stores software executed by the CPU 1001, and an internal converter 1004 connected with the machine 200. It should be noted that the factory monitoring system 100 may connected with the machine 200 via an external converter 800 instead of the internal converter 1004. As shown in FIG. 4, the factory monitoring system 100 includes a storage unit 1002, internal converter 1004, data acquisition unit 1011, stored data management unit 1012, control unit 1013, communication unit 1014 for communicating via the security shared network 300 with the service center management device 401, and format conversion unit 1015. As mentioned above, the factory monitoring system 100 may connect with the machine 200 via the external converter 800 in place of the internal converter 1004. The control unit 1013 controls the internal converter 1004, external converter 800, data acquisition unit 1011, stored data management unit 1012, communication unit 1014, and format conversion unit 1015. In addition, the control unit 1013 can simultaneously monitor the operating status of the external converter 800, data acquisition unit 1011, storage data management unit 1012, communication unit 1014, internal converter 1004, format conversion unit 1015, external converter 800, etc., and operating status of a higher order systems (service center management device 401, customer service center 402, manual server 403, SNS 404, sales data server 405, factory data server 406, knowledge system 408 or the like) via the communication unit 1014, and further, the operating status of a lower order machine 200.

At least one factory terminal (not illustrated) for displaying information sent from the service center management device 401 via the security shared network 300 is connected to the factory monitoring system 100. The information displayed is the screen information of FIGS. 7 to 13 described later, for example. The factory terminal includes a control unit (not illustrated) and a display device (not illustrated) such as a liquid crystal display including a display panel. A key operation screen is displayed on the display whereby character input is possible; however, an input unit such as a separate keyboard may be provided. The control unit displays information such as the screen information of FIGS. 7 to 13 sent from the service center management device 401 on the display. Data inputted by a touch panel (or input unit such as a keyboard) is sent to the service center management device 401. In addition, the factory monitoring system 100 receives display screen information in which the required data is displayed from the service center management device 401. It should be noted that, by the service center management device 401 including a Web server, and the factory terminal including a Web browser, it may be configured so as to display and control the screens of FIGS. 17 to 23.

FIG. 3 and FIG. 4 illustrate one factory monitoring system 100-1; however, a similar configuration is possessed also by each factory monitoring system 100-2, . . . , 100-n. As shown in FIG. 2A, each of the factory monitoring systems 100 is provided to the respective factories, is connected to machines via a network, and monitor the machines in the factory including the occurrence of alarms. FIG. 3 and FIG. 4 illustrate only machines 200-1 and 200-2; however, the factory monitoring system 100-1 monitors at least one machine 200. The plurality of machines 200-1, 200-2, . . . , 200-n are not limited to the products of a specific manufacturer, and can include machines of any plurality of manufacturers. Sensors which detect the position, acceleration, current value, temperature, humidity, etc. are installed to each of the plurality of machines 200-1, 200-2, . . . , 200-n. FIG. 3 shows a case of at least one of the sensors 2001-1, 2001-2, . . . , 2000-n being installed to the machine 200-1. The control device of the machine 200-1 reads information from the sensors 2000-1, 2000-2, . . . , 2000-n, and transmits this information to the factory monitoring system 100-1. The factory monitoring system 100 acquires information measured by the sensors and data of parameters indicating the operating state of the machine via an interface (communication protocol described later (data organization)) set in every respective machine 200 every predetermined period (e.g., period of no more than 100 milliseconds, etc.).

FIG. 6A shows an example of sensor data. In the control system such as that shown in FIG. 6A, the sensor data may be disturbance load torque, etc. calculated by the control device of the machine 200. For example, in the case of a machine having a mechanism converting the rotational motion of the motor 3002 into linear motion by the ball screw 3004 to cause the table 3001 of work to move linearly, as shown in FIG. 6A, the movement distribution within an operating limit of this table 3001 can be represented by a position signal of a pulse coder 3003 for the motor 3002, and the distribution (FIG. 6B) of the disturbance load torque calculated in the control device of the machine 200.

This distribution is sent to the factory monitoring system 100-1 from each of the machines 200-1, 200-2, . . . , 200-n within the factory, and totaled by the factory monitoring system 100-1. According to the totaling results thereof, by the ability to detect at which position of the ball screw the use is great, or at which position the load torque is great (FIG. 6C) when moving at a fixed speed, it is possible to detect uneven wear of the ball screw (uneven wear detection of ball screw). The detection of uneven wear of the ball screw is performed by the factory monitoring systems 100-2, ..., 100-$n$, similarly to the factory monitoring system 100-1.

Figure 6D:
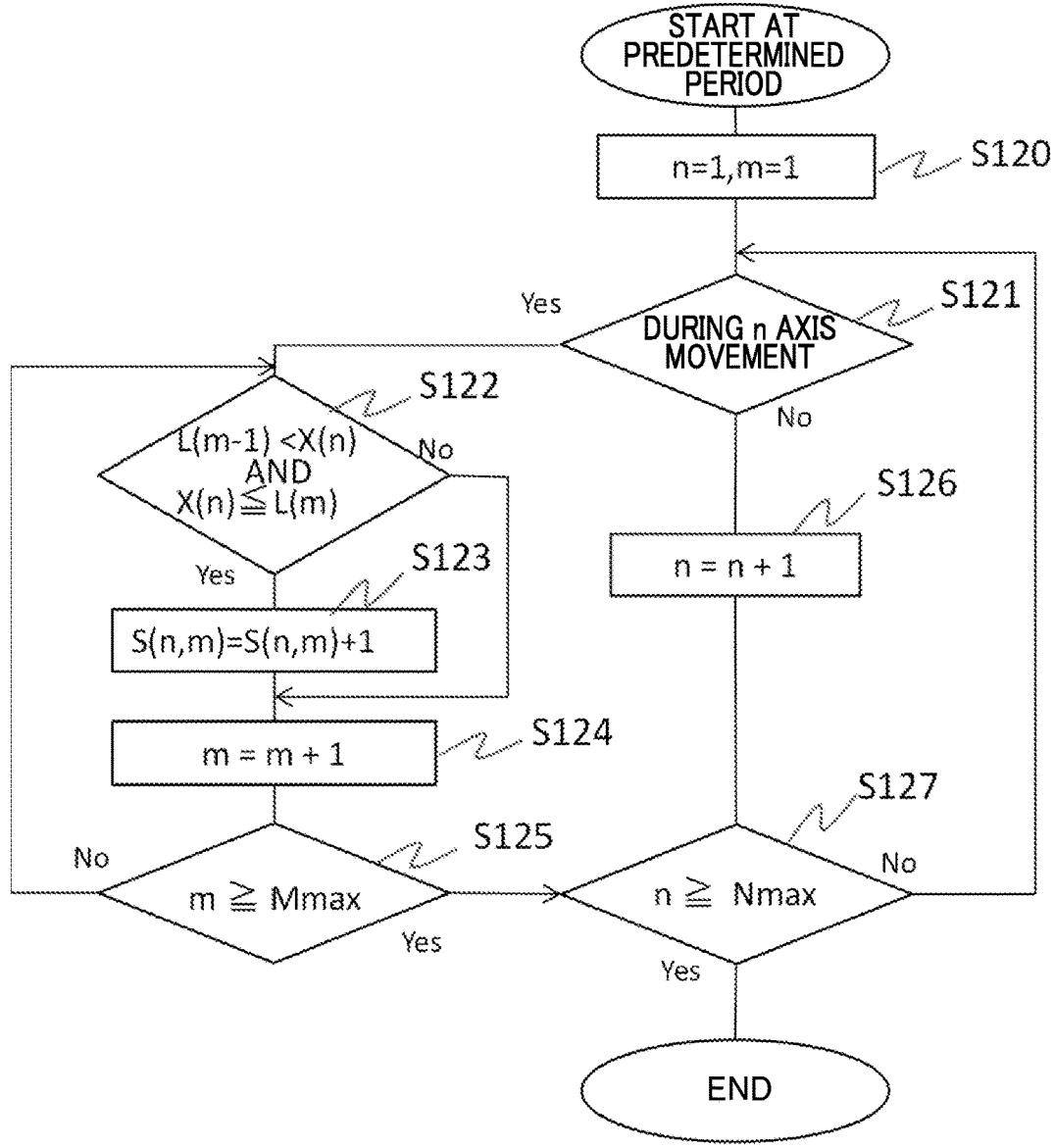
FIG. 6D is a flowchart showing control for obtaining a distribution of disturbance load torque of a machine 200.
Figure 6E:
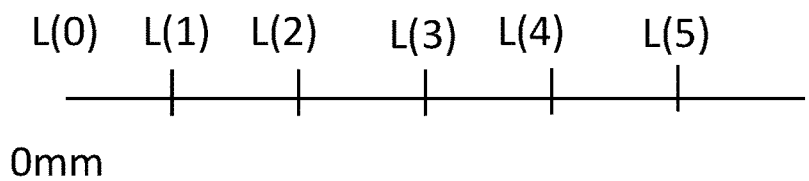
FIG. 6E is a diagram showing divided stroke.

FIG. 6D is a flowchart showing the control for obtaining a distribution of disturbance load torque of the machine 200. FIG. 6A shows a single axis machine 200, but FIG. 6D shows a flowchart of control for the case of a multi-axis machine 200. FIG. 6E shows the divided stroke, and the divided stroke is normally the distance between ball screw pitches (for example, at least several millimeters). As shown in FIG. 6D, the factory monitoring system 100 starts analysis of data from each machine at a predetermined period. In Step S120, the factory monitoring system 100 sets the axis number n of the machine to 1, and the division number m of the stroke of the ball screw to 1 (n=1, m=1). Next, in Step S121, the factory monitoring system 100 determines whether the n axis is during movement. It becomes n=1 at the start time. In the case of the n axis being during movement (YES in Step S121), in Step S122, the factory monitoring system 100 determines whether the current position X(n) of the n axis is larger than the position L(m−1) of the divided stroke, and no more than the position L(m) of the divided stroke. If the current position X(n) of the n axis is greater than the position L(m−1) of the divided stroke, and no more than the position L(m) of the divided stroke, in Step S123, the factory monitoring system 100 will add 1 to the cumulative number S(n,m) at the position of the $m^{th}$ stroke division of the n axis sampled at the predetermined period, and further adds 1 to the division number m of the stroke of the ball screw in Step S124. It should be noted that the cumulative number S(n,m) is completely reset to 0 during factory delivery, and during ball screw replacement. Counting of the cumulative number S(n,m) is only performed during movement, and is not counted while stopped. Then, in Step S125, the factory monitoring system 100 determines whether the division number m of the stroke of the ball screw to which 1 was added is at least a maximum value Mmax for the division number of the stroke of the ball screw. If the division number m of the stroke of the ball screw to which 1 was added is at least the maximum value Mmax for the division number of the stroke of the ball screw (YES in Step S125), the processing advances to Step S127. If the division number m of the stroke of the ball screw is not at least the maximum value Mmax for the division number of the stroke of the ball screw (NO in Step S125), the processing advances to Step S122. From Step S122 to Step S125 is repeated until the division number m of the stroke of the ball screw becomes at least the maximum value Mmax for the division number of the stroke of the ball screw. In Step S121, in the case of the factory monitoring system 100 determining the n axis as not being during movement (NO in Step S121), the factory monitoring system 100 adds 1 to the axis number n of the machine in Step S126, and determines whether the axis number n of the machine is at least the maximum axis number Nmax of the machine in Step S127. If the axis number n of the machine is not at least the maximum axis number Nmax of the machine, the processing returns to Step S121. Steps S121, S126 and S127 are repeated until the axis number n of the machine becomes at least the maximum axis number Nmax of the machine. If the axis number n of the machine is at least the maximum axis number Nmax of the machine, the processing is ended. The position L(m) of the divided stroke (for example, L(0), ..., L(5), etc. in FIG. 6E), maximum value Nmax, and maximum value Mmax are set in accordance with the machine use during factory delivery.

The machine information of each of the at least one machines 200-1, 200-2, ..., 200-$n$ is registered in the factory monitoring system 100-1 for every machine in advance when connecting the machines 200-1, 200-2, ..., 200-$n$ to the factory monitoring system 100-1. More specifically, the factory monitoring system 100-1 registers the meta-data related to the machines for every machine number identifying the respective machines. As shown in the machine information of FIG. 3, for example, the meta-data is the maker name of the machine, model name of the machine, serial number of the machine, use control device name, control device maker serial number, communication interface, communication protocol (data organization), etc. The maker name, model name, serial number, etc. of the machine are data for specifying the machine. The machine number may be set as a number that is unique within each factory. In addition, the machine number may be set as the maker name, model name, or serial number of the machine. Herein, communication protocol (data organization) is a command system for the factory monitoring system 100 to acquire information measured by the sensors installed to this machine, data of parameters indicating the operating state of the machine, various alarm data, etc.

The factory monitoring system 100 includes a data acquisition unit 1011 shown in FIG. 4, and the control unit 1013 designates the machine number, and acquires the operating state, etc. of the machine every predetermined period (for example, period no more than 100 milliseconds, or the like), via the data acquisition unit 1011. It should be noted that the data acquisition unit 1011 acquires the operating state, etc. of this machine based on the communication protocol (data organization) of this machine corresponding to the machine number. The information of the operating state, etc. of the machine thus acquired is stored in the storage unit 1002 together with the acquisition time (time stamp). In the above way, each of the factory monitoring systems 100 acquires data serving as the basis of the diagnostic service system 1.

Similarly, the control unit 1013 designates a machine number, and acquires alarm data generated in the respective machines at every predetermined period (e.g., period of no more than 100 milliseconds, etc.) via the data acquisition unit 1011. It should be noted that the data acquisition unit 1011 acquires data related to alarm occurrence and alarm ceasing of this machine, based on the communication protocol (data organization) of this machine corresponding to the machine number. In addition, also for the resetting of an alarm, automatic ceasing of an alarm, etc. such as that explained in (4) and (5), it is preferable to acquire and store as maintenance history in a centralized manner. The acquired data related to an alarm of the machine is stored in the storage unit 1002 along with the acquisition time (time stamp). In the aforementioned way, each factory monitoring system 100 can acquire past alarm history data of every machine, and current machine state data of every machine, which serves as the foundation of the diagnostic service system 1.

Each of the plurality of machines 200-1, 200-2, ..., 200-$n$ can employ a machine having different hardware or protocol such as Ethernet (registered trademark), Ether Cat (registered trademark), RS485 and RS232C. As shown in FIG. 4, the electrical differences are converted using the internal converter 1004 of the factory monitoring system 100-1, and the inside of the factory monitoring system 100-1 is entirely compatible with the Ethernet communication standard. It should be noted that conversion from RS485, RS232C, etc. to Ethernet may be configured so as to connect the external converter 800 of a commercially available converter, etc. to the machine, instead of the internal converter 1004. This similarly applies also for the other factory monitoring systems 100-2, . . . , 100-n.

In addition, in the case of the operating data, history data, manipulation history data, alarm data, etc. inputted from various machines 200-1, 200-2, . . . , 200-n being viewed from the higher order service centers 600-1, 600-2, . . . , 600-n, the factory monitoring system has a function of standardizing the data array and/or units (global format), and storing in the global format in the storage unit 1002, so as to be able to determine as data of the same type. By configuring in this way, it is possible to judge as data of the same type, in the case of operating data, history data, manipulation history data, alarm data, etc. being view from high-order service centers 600-1, 600-2, . . . , 600-n. Machine information such as manufacturer name and model name in FIG. 3 is used in an electrical or software-based conversion, and this machine information is registered in advance when connecting the machine to the factory monitoring system.

More specifically, the storage unit 1002 in the factory monitoring system 100 stores in advance the protocols P1, P2, . . . , Pn, etc. of software communicating to every machine number, as shown in FIG. 3. This protocol includes metadata such as of the data array and units related to the temperature, speed, operating data, alarm data, etc. The control unit 1001 such as a CPU references the protocol stored in the storage unit 1002 using software stored in the storage unit 1003, extracts data from the machines 200-1, 200-2, . . . , 200-n, and replaces with data organization (global format) used by the overall system. In addition, the control unit 1001 has a function of adding the time of when making data communication, and sending to the storage unit 1002. The storage unit 1002 is installed on a circuit capable of being read from another CPU. The protocols P1, P2, . . . , Pn, machine information I1, I2, . . . , In stored in the storage unit 1003 correspond to the machines 200-1, 200-2, . . . , 200-n.

Operations of the factory monitoring system 100 will be explained using the block diagram showing the configurations of the machine and factory monitoring system 100 in FIG. 4, and the flowchart in FIG. 5.

As shown in FIG. 5, the data acquisition unit 1011 of the factory monitoring system 100 sends an instruction (command) to each machine 200 in order to acquire various data including alarm data from each machine 200 periodically in Step S110. Each machine 200 sends data in accordance with the instruction (command). As already mentioned, the factory monitoring system 100 can be connected with machines of different protocols (physical layer) such as Ethernet (registered trademark), EtherCat (registered trademark), RS485 and RS232C. As shown in FIG. 4, the electrical difference is converted using the internal converter 1004 of the factory monitoring system 100, and the inside of the factory monitoring system 100 is completely unified to the electrical standard of the Ethernet. In addition, for the conversion from RS485, RS232C, etc. to Ethernet, an external converter such as a commercially available converter can also be used.

In Step S111, the electrical standard is changed using the internal converter 1004 or external converter 800, and the data acquisition unit 1011 acquires various data including alarm data from each machine 200. The acquisition of data is performed every predetermined period (for example, period of no more than 100 milliseconds, or the like).

In the case of there being data processing such as that explained using FIGS. 6B and 6C (YES in Step S112), data processing is performed in Step S113, and is converted to a shared format (global format) by the format converter 1015 in Step S114.

In the case of there not being data processing (NO in Step S112), the processing advances to Step S114. Subsequently, the data converted to the shared format is stored in the storage unit 1002 by the stored data management unit 1012 (Step S115). The stored data management unit 1012, when storing data, stores together with time information of when acquiring the data (time stamp). The time information may be time information when stored.

<Configuration and Operation of Service Center Management Device 401>

Figure 2B:
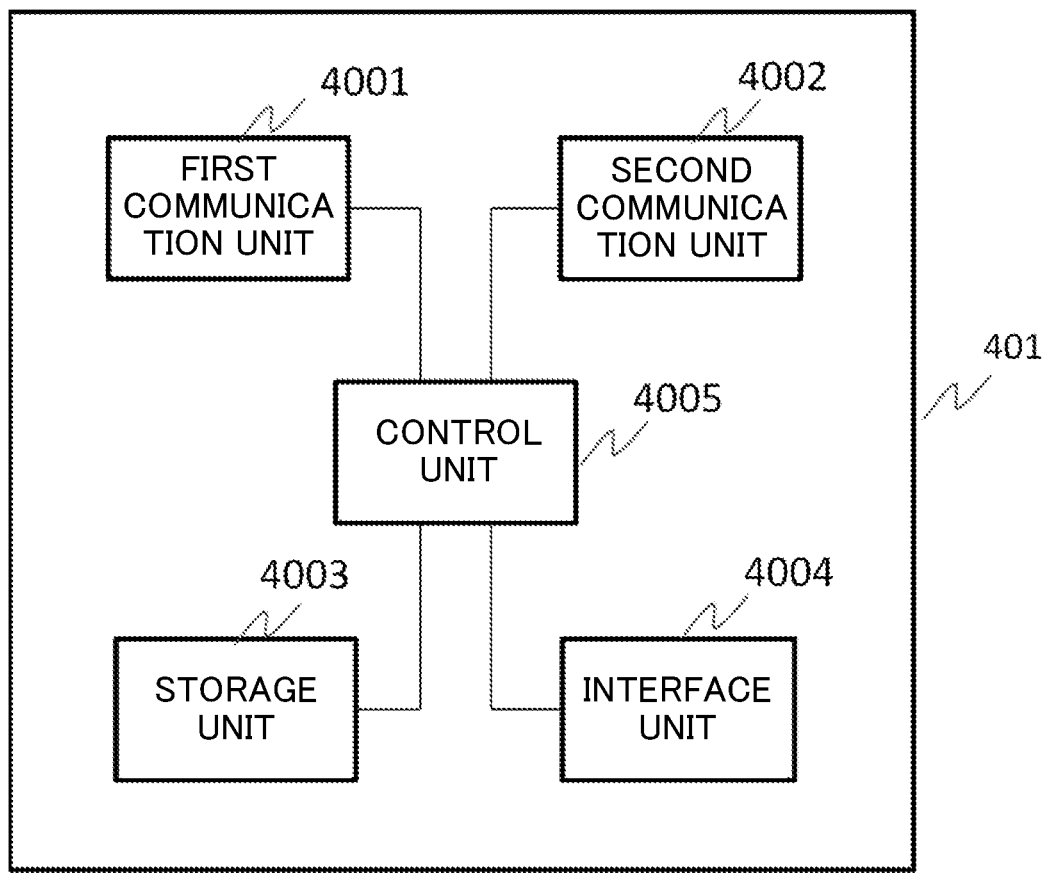
FIG. 2B is a block diagram showing the configuration of a service center management device 401.

The service center management device 401 is a management device for a case of at least one service center 600-1, 600-2, . . . , 600-n being arranged globally. In the case of there being one connected service center, this service center may also serve as a service center management device, and execute the same functions. FIG. 2B is a block diagram showing the configuration of the service center management device 401.

The service center management device 401 includes a first communication unit 4001 that communicates with the factory monitoring system 100 via the security shared network 300; a second communication unit 4002 that communicates with the service center 600 via a network; a storage unit 4003 that stores data for constituting a charged membership system; an interface unit 4004 connected with a customer service server 402, a manual server 403, SNS 404; a sales data server 405, a factory data server 406, and knowledge system 408; and a control unit 4005 controlling each unit. The control unit 4005 accesses the customer service server 402, manual server 403, SNS 404, sales data server 405, factory data server 406 or knowledge system 408, based on a request from the factory monitoring system 100 or service terminal 700, and obtains the requested data and sends to the factory monitoring system 100 and service center 600.

In the case of configuring the functions of the control unit 4005 of the service center management device 401 by software, these functions can be realized by causing programs encoding the operations of the control unit 4005 of the service center management device 401 to run by a computer. The computer is configured by a storage unit such as a hard disk or ROM storing the programs encoding the operations of the control unit 4005, DRAM storing data required in computation, a CPU, and a bus connecting each part. Then, in this computer, the functions of the control unit 4005 can be realized by storing the information required in computation in the DRAM, and causing these programs to run in the CPU.

The service center management device 401 is connected with a sales data server 405 that stores sales data when receiving an order for the machine 200 from the customer (factory) of the present diagnostic service system, and a factory data server 406 that stores factory data such as inspection data and delivery date, and components being used, when producing each machine 200. In addition, the service center management device 401 is connected with a field serviceman position information system 407, and is able to track the position of a field serviceman worldwide from GPS data such as of the portable telephone possessed by the field serviceman.

Furthermore, the service center management device 401 is connected with the knowledge system 408. The knowledge system 408 automatically analyzes the machine status according to free text inputted by the user, accesses the database 409 recording failure know-how according to the contents thereof, and sends the contents made by automatically creating analysis information corresponding to the machine status to the service center management device 401. In addition, by learning the correlation between the history data of a machine and the failure occurrence, and creating a learning model thereof, the user inputs the current state data of the machine into this learning model, whereby the knowledge system 408 can send diagnosis results such as the possibility of future failure occurrence (for example, probability) for this machine, and preventative maintenance contents necessitated in order to avoid failure, to the service center management device 401.

In addition, the service center management device 401 monitors the communication load status, etc. of each service center 600, and automatically distributes to a service center of low load. Alternatively, the service center management device 401 may be configured so as to output a response request to all of the service centers 600-1, 600-2, . . . , 600-n, determine the service center with the fastest response as the service center with low communication load, and perform fault diagnosis having an inquiry from a unique customer by this service center. Furthermore, by the user designating the responder when inquiring to the service center management device 401 by the factory monitoring system, inquiry mail or inquiry IP phone, it is possible to for the user to make a connection request to a familiar responder. The diagnostic service system 1 can establish the fee-based service of a membership service. A membership service providing the diagnostic service system 1 for a fee to a member can be constructed by providing the storage unit 4003 to the service center management device 401 as shown in FIG. 2B, and recording the access frequency, access time, etc. of users. For example, in the case of a user inquiring to the service center management device 401 by the factory monitoring system 100, inquiry mail 104 or inquiry IP phone 105, the control unit 4005 records the access frequency, access time, or the like of the user in the storage unit 4003. More specifically, the control unit 4005 stores, in the storage unit 4003 to be associated with the user ID of the inquiry source, the frequency or connection time inquiring to the service center management device 401 from the factory monitoring system 100, frequency of inquiring to the service center management device 401 by inquiry mail 104, and call time, etc. in the case of inquiring to the service center management device 401 by the inquiry IP phone 105. By billing the fee corresponding to this frequency or time, a pay-for-use system is constructed. It is also possible to provide the diagnostic service system 1 as a fixed charge.

Additionally, the service center management device 401 is connected with the social network system (SNS) 404, manual server 403 as a system managing manuals of different manufacturers, and the customer service server 402 which records information related to customer service. It should be noted that the client service server 402 stores information for which security management is important, for example, member information such as member ID, machine information, maintenance history, alarm history, warranty information, etc.

<Diagnostic Service System Menu>

The service center management device 401 includes a function of providing the diagnostic service system menu shown in FIG. 7 to the user by way of the factory monitoring system 100. To receive the diagnostic service system shown in FIG. 7, first, the user inputs a user ID and password on the authentication screen shown in FIG. 8. Herein, the user ID is linked to the factory to which the user belongs, and the service center management device 401 can specify the factory from the user ID. When the user inputs the user ID and password, the company name (factory name) and address thereof are displayed on the authentication screen. If the user inputs OK on the authentication screen, a screen of the diagnostic service system menu shown in FIG. 7 is displayed. On the screen displaying the diagnostic service system menu shown in FIG. 7, when the user inputs the number of a system used, any of the screens (submenus) shown in FIG. 9 designated by the number of the system is displayed. When the required information is inputted and execution is selected by the user on any of the screens shown in FIG. 9 (submenus), the selected service is provided, and the program processing for executing the provided function by the respective services is executed.

The diagnostic service system can be used by a user, or an operator (responder) of the service center 600. In the case of being used by the user, for example, knowledge diagnosis is performed using "3. Knowledge Diagnostic System" by the user him/herself. Furthermore, the user uses "4. Maintenance History Search", "5. Scheduled Maintenance History", etc. to acquire the operating status of this machine immediately before a failure report time (alarm occurrence time) of this machine, operating status of this machine (way of use), maintenance history thus far of this machine, etc. based on the machine number, and uses their own knowledge to perform fault diagnosis. It should be noted that, due to storing in a centralized manner the reset of an alarm, automatic ceasing of an alarm, etc. as maintenance history, it is possible to display information related to the estimation of the possibility of abnormality occurrence, and preventative maintenance of this machine, such as that shown in FIG. 27, for example, based on the alarm history, current machine state, etc. explained in (4) and (5). In addition, based on the machine number, it is possible to acquire the past alarm history data of this machine, the current machine state, etc. of this machine according to "4. Maintenance history search", "5. Scheduled maintenance history", etc., estimate the possibility of abnormality occurrence of this machine, and acquire information related to preventative maintenance by way of knowledge diagnosis. FIG. 27 shows a display example of information related to preventative maintenance. Similarly, in the case of using by a user, for example, it is possible to perform knowledge diagnosis using "3. Knowledge diagnostic system". As mentioned earlier, by using the learning model made by learning the correlation between the history data of a machine and failure occurrence, and the user inputting the current state data of the machine into this learning model, it is possible to display diagnosis results such as the possibility of future failure occurrence for this machine (for example, probability) and preventative maintenance contents necessitated in order to avoid failure, as shown in FIG. 29, for example. Next, the main submenus provided by the diagnostic service system menu will be explained. In the following explanation, a case of the user using submenus will be explained.

<Manual Search System>

In the case of the user selecting the submenu "1. Manual Search System", the user inputs the machine number and keyword desired to be searched, on the screen of the manual search system of FIG. 9. Based on the input information, the service center management device 401 searches the contents hitting the keyword from the maker manual of a specified machine recorded in the manual server 403, based on machine information such as the maker name and model name, stored in advance as shown in FIG. 3, and displays as a list. The user can select the required item from the list display to achieve the objective.

Figure 10:
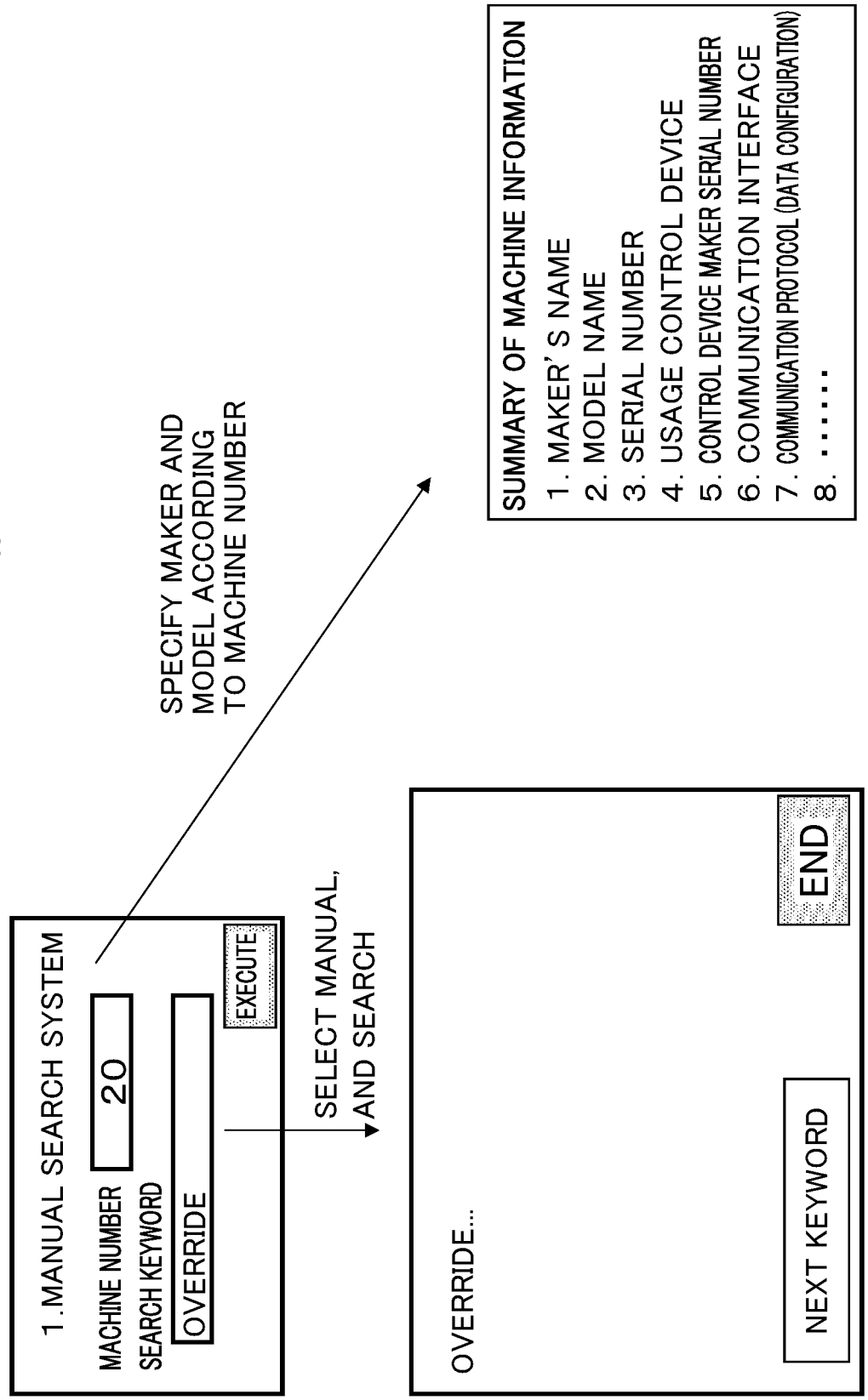
FIG. 10 is a view showing a screen of a manual search system and an input example.

More specifically, when the user inputs "20" as the machine number on the screen of the manual search system displayed as shown in FIG. 10, and inputs "override" as the keyword desired to be searched, the service center management device 401 specifies the machine maker and model name based on the machine number "20", and selects the manual having this model from the manual server 403 as the manual. Next, the service center management device 401 searches the selected manual based on the keyword of "override", and displays pages hit from the header. When the user selects "next keyword", the service center management device 401 displays the next page hit. The pages are scrolled by "↑" and "↓", and in the case of information that the user wants to know being obtained from the manual, the user returns to the diagnostic service system menu of FIG. 7 by selecting the end key.

<Fault Diagnostic System>

Figure 11:
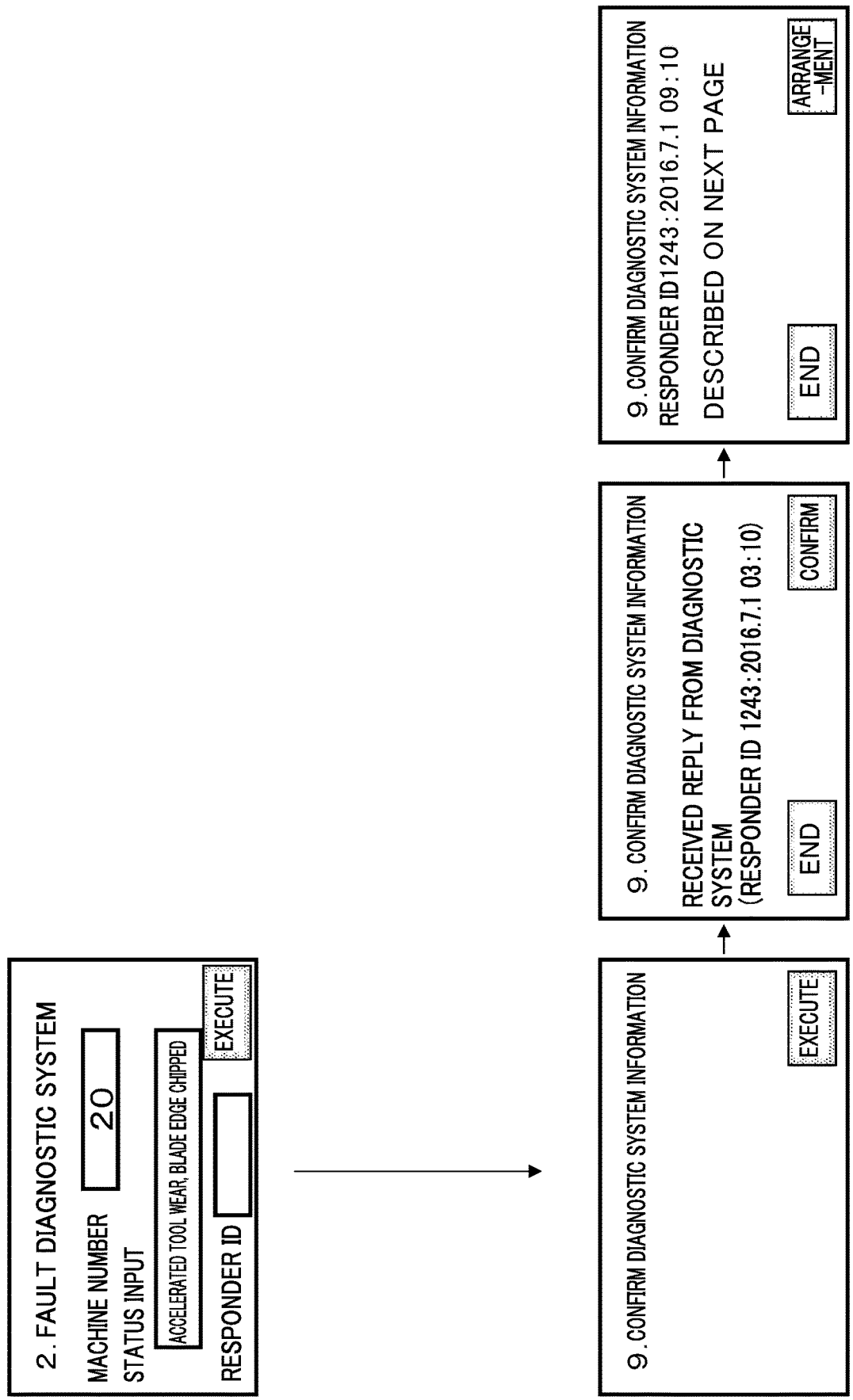
FIG. 11 is a view showing a screen of a fault diagnostic system and input example, and a diagnostic system information confirmation screen.

The submenu "2. Fault Diagnostic System" is selected when the user demands a response from a responder (operator of service center), in the case of an alarm of the machine 200 occurring, for example. In the submenu "2. Fault Diagnostic System", the user performs input of the machine number and status on a predetermined interview sheet such as that shown in FIG. 9. For example, when the user inputs "20" as the machine number, and inputs "accelerated tool wear, blade edge broken" as the status input as shown in FIG. 11, on the screen of the fault diagnostic system of FIG. 9 (screen of predetermined interview sheet), a responder who can respond the fastest is selected by the service control 601 via the service center management device 401 and service center 600. More specifically, the service center management device 401 selects a responder (candidate) who can respond the fastest, by referencing a table for managing the working situation of operators of the service center 600. It should be noted that the user can designate the responder ID on the input screen. In this case, the responder designated by the user is selected. In the case of the user designating the responder ID, the service center management device 401 transmits the machine number and status input to a corresponding service terminal. In the case of the designated responder not being present, the service center management device 401 notifies the reason to the user, as well as transmitting the machine number and status input to another responder who can respond the fastest. In addition, the service center management device 401, in the case of requiring time for response of the designated responder, notifies the user of this fact.

Figure 9:
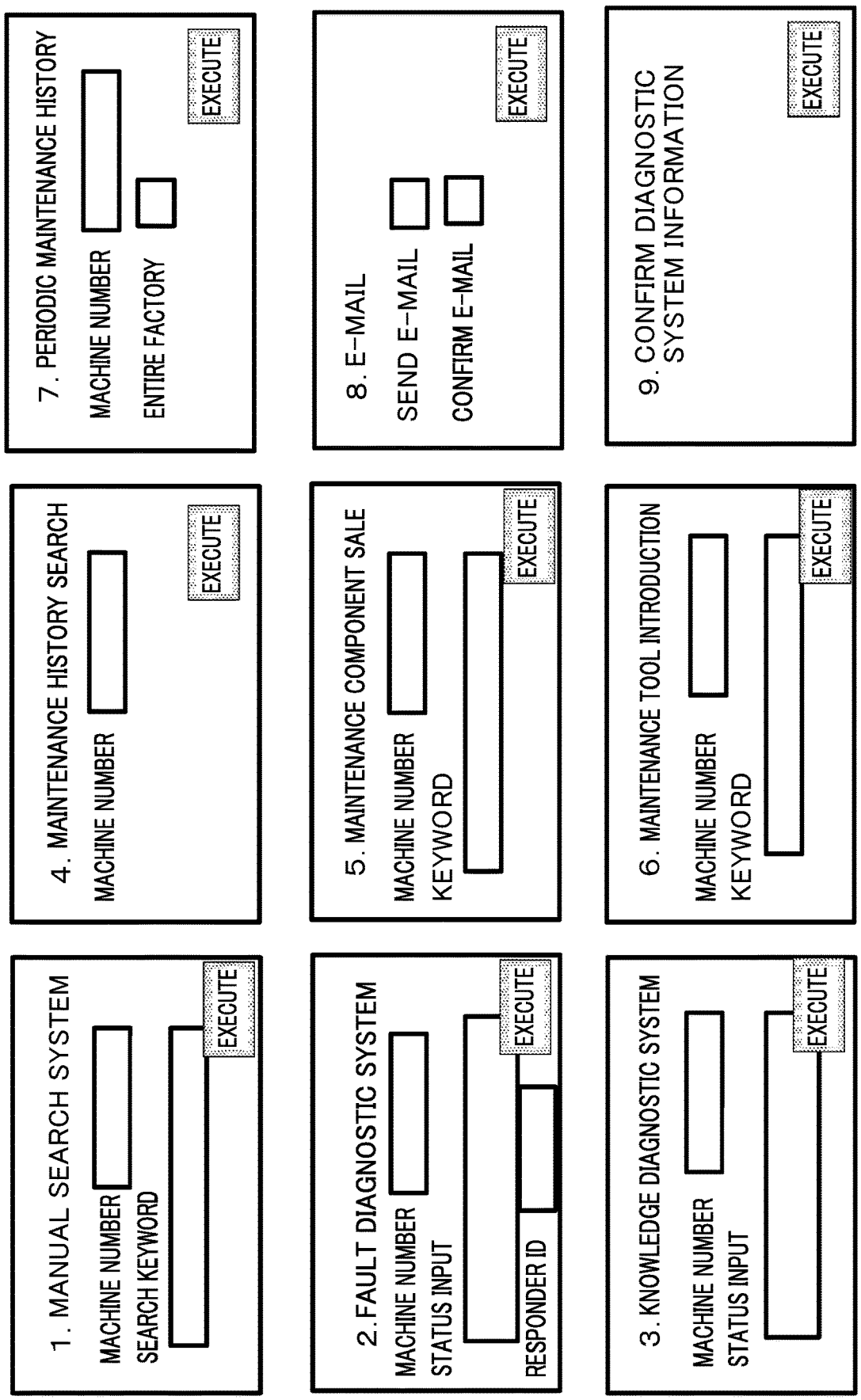
FIG. 9 is a view showing a selection screen of a diagnostic service system menu.

In the case of the user using the fault diagnostic system of FIG. 9, the user can send the data required in fault diagnosis, which is the operating data of the machine that is the target at this time, to the service center management device 401. Whether or not to select this sending as automatic or manual is selectable upon membership contracting. In the case of not selecting automatic sending, it is possible for the user to manually send following the instructions of the responder.

As the fault reporting route from the user, there are other routes via mail or inquiry IP phone. In the case of mail reception, a contact (operator) creates an interview sheet based on the contents of the received mail. In addition, in the case of IP phone reception, the contact (operator) creates the interview sheet while listening to the speech of the user via the IP phone.

By making an inquiry based on the sent machine number, the responder can grasp the operating condition including the alarm occurrence state in the factory of the machine corresponding to this machine number and condition when delivered. In addition, the responder starts analysis of failure contents from the sent message. The responder performs manipulation of the service terminal 700 to perform failure diagnosis. The manipulation of the service terminal 700 for performing failure diagnosis is described later. In the case of the responder, as a result of fault diagnosis, determining that replacement of components and dispatch of a field engineer for replacing components are necessary, can enquire to the service center 600 from the service terminal 700, and notify to the questioner (user) a response such as the component delivery data, arrangement of field serviceman, and arrival time.

The questioner (user) can confirm the response from the responder by selecting "9. Diagnostic System Information Confirmation" on the diagnostic service system menu of FIG. 9. More specifically, the questioner (user) selects the execute key on the screen of "9. Diagnostic System Information Confirmation" shown in FIG. 11 to confirm the response from the responder. In the case of confirming the response message from the responder, the questioner (user) selects the confirmation key. The response message from the responder includes information such as diagnosis information, components, and field serviceman dispatch, as shown in FIG. 12. In the case of the questioner (user) accepting dispatch of a field serviceman, the field serviceman is arranged by the questioner (user) selecting an arrange key. In the case of the user selecting the arrange key, and approving the proposal of the responder, the components and field serviceman are immediately dispatched. When the field serviceman arrives on site, work is started. The exchanges between the operator and user in this business practice are registered in the customer service server 402 in chronological order. It should be noted that the field serviceman can also diagnose the status of other machines of the user visited. A recording of this time is also recorded in the customer service server 402. By the user using the present failure diagnostic system in the above way, it is possible to use the shortest failure diagnosis having a high degree of accuracy, and rapidly repair the failed part. In addition, based on the machine number, the user can acquire past alarm history of this machine, current machine state of this machine, etc. from "4. Maintenance history search", "5. Scheduled maintenance history", etc., estimate the probability of abnormality occurrence of this machine, and acquire information related to preventative maintenance by way of knowledge diagnosis.

<Knowledge Diagnostic System>

The submenu "3. Knowledge Diagnostic System" provides a function of a knowledge diagnostic system to the user. By doing this, the user can diagnosis the cause, etc. of the alarm occurrence him/herself, without demanding a response from a responder (operator of service center). When the user inputs the machine number and status via the screen of "3. Knowledge Diagnostic System" shown in FIG. 9, the knowledge system 408 automatically analyzes the status according to free text, accesses the database 409 recording failure know-how according to the contents thereof, and replies the auto-answer contents via the service center management device 401. As a result of response, in the case of the cause of failure being the machining conditions, wear of the machining tool, etc., components ordering of the machine tool and dispatch of a field serviceman are unnecessary. In the case of the cause of failure being other than the machining conditions, wear of the machining tool, etc., the user selects the screen of "2. Fault Diagnostic System" in FIG. 9, and in the case of component ordering and dispatch of a field serviceman being necessary as a result of fault diagnosis, performs reservation of the aforementioned components and field serviceman. In addition, by saving the response of the knowledge system, it is possible to create a user unique fault diagnosis guidance. Similarly, using the learning model made by learning the correlation between the history data of the machine and incident situation, when the current state data of the machine is inputted to this learning model by the user, the knowledge system 408 performs diagnosis such as of the possibility of future failure occurrence for this machine (for example, probability) and preventative maintenance contents necessitated in order to avoid failure using the learning model, and replies the diagnosis results via the service center management device 401. The submenu "3. Knowledge Diagnostic System" is basically a diagnostic survey by self-service of the user, and is not requesting fault diagnosis to the service center 600. The knowledge diagnostic system can respond with a priority order to the diagnosis results.

<Maintenance History Search>

By the user selecting the submenu "4. Maintenance History Search", and inputting the machine number to the screen of "Maintenance History Search" shown in FIG. 9, the service center management device 401 references the maintenance history in the customer service server 402. According to this function, the user is able to automatically manage the specific machine fault log in a factory, component delivery log, and field serviceman dispatch log without managing in-house. In addition, by accumulating and referencing machine fault logs, it becomes possible to construct a unique knowledge system.

<Maintenance Component Sales>

By the user selecting the submenu "5. Maintenance Component Sales", and inputting the machine number on the screen of "Maintenance Component Sales" shown in FIG. 9, the user can buy maintenance components required by the machine from the component shipping center 500 via the service center 600. The user can easily buy maintenance components required by the machine without mistakes, even in a case of owning equipment of different manufacturers.

<Maintenance Tool Referral>

By the user selecting the submenu "6. Maintenance Tool Referral", and inputted the machine number on the screen of "Maintenance Tool Referral" shown in FIG. 9, the user can buy maintenance tools required by the machine. In addition, by using a social network, the user can reference tools effective in maintenance.

<Scheduled Maintenance History>

By the user selecting the submenu "7. Scheduled Maintenance History", and inputting the machine number on the screen of "Scheduled Maintenance History" shown in FIG. 9, the user can reference the performed time of scheduled maintenance conducted in the past of each machine maker, and the maintenance contents thereof recorded in the factory data server 406. Since the scheduled maintenance history is managed all together in this way, even in a case of machines of different manufacturers and different approaches to maintenance coexisting, the user can comfortably use without being aware of the differences in manufacturers. In addition, the submenu "7. Scheduled maintenance history" is configured so as to be able to reference past alarm history data (alarm identification information, alarm occurrence time, alarm ceasing time, processing of user done during alarm occurrence, etc.) of each maintenance recorded in the factory data server 406, by the machine number being inputted. More specifically, by the machine number being inputted on the screen of "Scheduled maintenance history" shown in FIG. 9, it is possible to obtain alarm history such as that of FIG. 25 from the main system. For example, door switch alarm indicates an alarm showing that a door closed confirmation switch on the door is broken, or a signal cable of the door closed confirmation switch is broken, and X-axis overload indicates an alarm showing that the load is large and difficult to rotate, and shows a problem in motor command current. In addition, By the user selecting the submenu "7. Scheduled Maintenance History", and inputting the machine number on the screen of "Scheduled Maintenance History" shown in FIG. 9, the user can obtain the current value information of the machine state recorded in the factory data server 406, by the machine number being inputted. For example, as shown in FIG. 26, the user can obtain the current value information of the machine state of the machine identified by this machine number. By configuring in this way, the diagnostic service system 1 can determine, based on the past alarm history data of this machine and current value information of the machine state, that the machine identified by this machine number, for example, is currently operating normally, but the battery decline alarm occurred twice in the past, for example. Herein, current value information indicates the current status when defining normal as 100%. There is a threshold in the respective machines, and an alarm is generated when it falls below this. The current values shown in FIG. 26 show the condition when not falling below any thresholds. As mentioned above, in the case of a battery alarm, a check of the remaining amount of battery during power activation by the machine is made, and even if an alarm is occurring, the operator is permitted to manipulate to reset the battery alarm. By configuring in this way, it is possible to make this machine operable. In the case of such a machine, if not replacing the battery prior to the battery being completely drained, there is a possibility of inducing a serious hindrance in that the contents of the memory backed up by this battery disappear. In order to avoid such a situation, in the case of the alarm frequency having occurred in a predetermined period exceeding a predetermined threshold, or the elapsed time since a most recent battery decline alarm occurred exceeding a predetermined threshold, the diagnostic service system 1 can provide preventative maintenance information which instructs battery replacement to the user as shown in FIG. 27. More specifically, the diagnostic service system can determine whether or not a battery alarm occurred in the past by referencing the history data, and by referencing the current data, determine whether the contents of memory backed up will disappear in the case of turning off the power supply of the machine. By configuring in this way, the diagnostic service system can provide preventative maintenance information to the administrator. It should be noted that, since a predetermined period and/or the alarm frequency having occurred in the predetermined period, elapsed time since a most recent battery decline alarm occurred, etc. respectively differ depending on the type of battery, in order to send a warning in accordance with the specification of the battery, it is possible to set the predetermined time, threshold for alarm frequency, and threshold for elapsed time since the most recent battery decline alarm occurred in the system in advance.

In addition, as an example of an alarm which self restores, there is a fan alarm. As mentioned earlier, the fan motor starts rotation of the fan simultaneously with power supply start, and while the fan alarm occurs, so long as the machine cannot operate, but the power supply is not off, the fan generally comes to be able to continue rotation. On the other hand, for the machine identified by the inputted machine number shown in the example of FIG. 25, there is a possibility of the fan alarm occurring when the temperature during operation start is low. This occurs by the oil mist adhering to the fan sticking. For this reason, although the oil mist around the time of rotation start of the fan motor is hard, rotation is started, and it is estimated that the temperature rises as the fan operates, and the oil mist adhering to the fan softens. When this is done, the fan motor alarm of the fan motor automatically ceases when the oil mist adhered to the fan softens to some extent, and it becomes possible to operate this machine. In this way, the machine identified by this machine number shown by the example of FIG. 25 is an example for which alarm occurrence history in which an alarm of the fan motor occurred does exist, but the current value related to oil mist adhering to the fan of this machine is normal. Similarly, depending on the contents of the alarm, there are also cases where, so long as there is no alarm data history in the past, even if the current value indicates abnormality, it automatically recovers as in the fan alarm. Also for the fan alarm, similarly to the battery decline alarm, for example, in the case of rotation being started from the moment of alarm occurrence during rotation start of the fan motor, and the temperature rising as the fan operates, and the operation running time until the moment when ceasing the fan alarm exceeding a predetermined threshold, the diagnostic service system 1 can provide preventative maintenance information instructing fan motor replacement to the user.

In addition, when the machine number is inputted by the user, "7. Scheduled maintenance history" references the current state data of this machine stored in the factory data server 406 and the learning model which was made by learning the correlation between the history data of this machine and the failure occurrence, and provides diagnosis results such as the possibility of a future failure occurring (for example, probability) for this machine and preventative maintenance contents necessitated in order to avoid failure to the user, as shown in FIG. 28. In the above way, according to the present invention, it is possible to comprehensively and efficiently monitor the machine state of each machine based on the past history data and current machine state of each machine, and based on the status of each machine, provide information related to preventative maintenance to the user, and recommend preventative maintenance.

<Other>

By the user selecting the submenu "8. E-mail (SNS)", and selecting any of E-mail sending or E-mail confirmation via the screen of "E-mail" shown in FIG. 9, the user is able to directly send mail to the service center management device 401 from their own personal computer (PC), smartphone, or present system, and conversely receive mail from the service center management device 401. The user is thereby able to manage mail sent to the service center management from their own PC, smartphone or present system. The diagnostic service system provides a function of social network (SNS) in addition to mail. By doing this, the exchange of business information and technical information between members managed by security is possible.

<Diagnostic Service System Information>

When the user selects the submenu "9. Diagnostic System Information", and selects execution on the screen of "Diagnostic System Information Confirmation" shown in FIG. 9, the user can confirm the diagnostic service system information notified to the user from the diagnostic service system side. As the diagnostic service system information, there is important fault information (including bug information), recall information, version update information of the diagnostic service system 1, etc., for example. For example, in the case of an important fault necessitating recall occurring in the diagnostic service system itself, the service center or service center management can transmit recall information. The user can thereby instantaneously reference the transmitted recall information In addition, the user can also confirm contacting such as for version update of the diagnostic service system. It should be noted that the diagnostic service system can also mail by a push system to the mobile telephone (or smartphone, etc.) of the user registered in advance, according to the severity of the diagnostic service system information, as a notification method of diagnostic service system information.

<Evaluation on Response>

FIG. 13 is a view showing an "evaluation information input screen" for inputting a user evaluation for the response from the diagnostic service system 1. By way of the evaluation information input screen, it becomes possible to carry out skill improvement of responders, and added learning of the knowledge system based on the input information from the user. The diagnostic service system menus have been explained above.

<Processing Flow of "2. Fault Diagnostic System" and "3. Knowledge Diagnostic System">

Next, the processing flow of the diagnostic service system 1 for a case of the user selecting the submenu "2. Fault Diagnostic System", and a case of selecting the submenu "3. Knowledge Diagnostic System" will be explained while referencing FIGS. 14 and 15.

(Case of User Selecting "3. Knowledge Diagnostic System")

Figure 14:
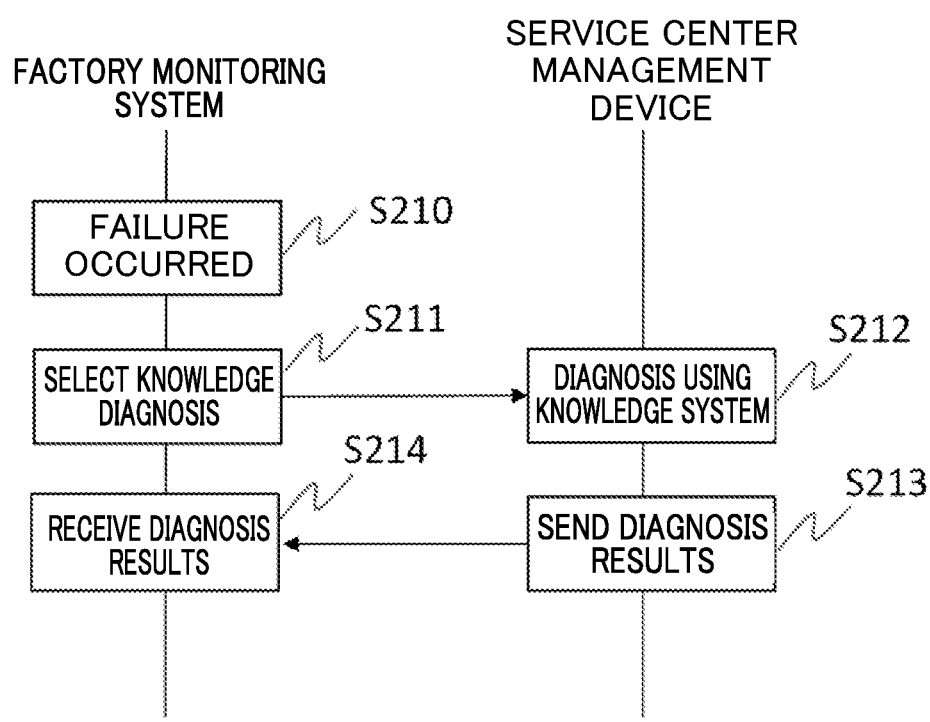
FIG. 14 is a view showing the flow of the diagnostic service system in a case of selecting a knowledge diagnostic system.

As shown in FIG. 14, in the case of an alarm of a machine tool occurring in Step S21, the user selects "3. Knowledge Diagnostic System" in Step S211 on the factory monitoring system 100-1. When "3. Knowledge Diagnostic System" is selected, the knowledge system 408 starts diagnosis based on the input from the user in Step S212. In Step S213, the knowledge system 408 sends the diagnosis results to the user when completing the diagnosis. In Step S214, the user acquires the diagnosis results from the knowledge diagnostic system.

(Case of User Selecting "2. Fault Diagnostic System")

Figure 15:
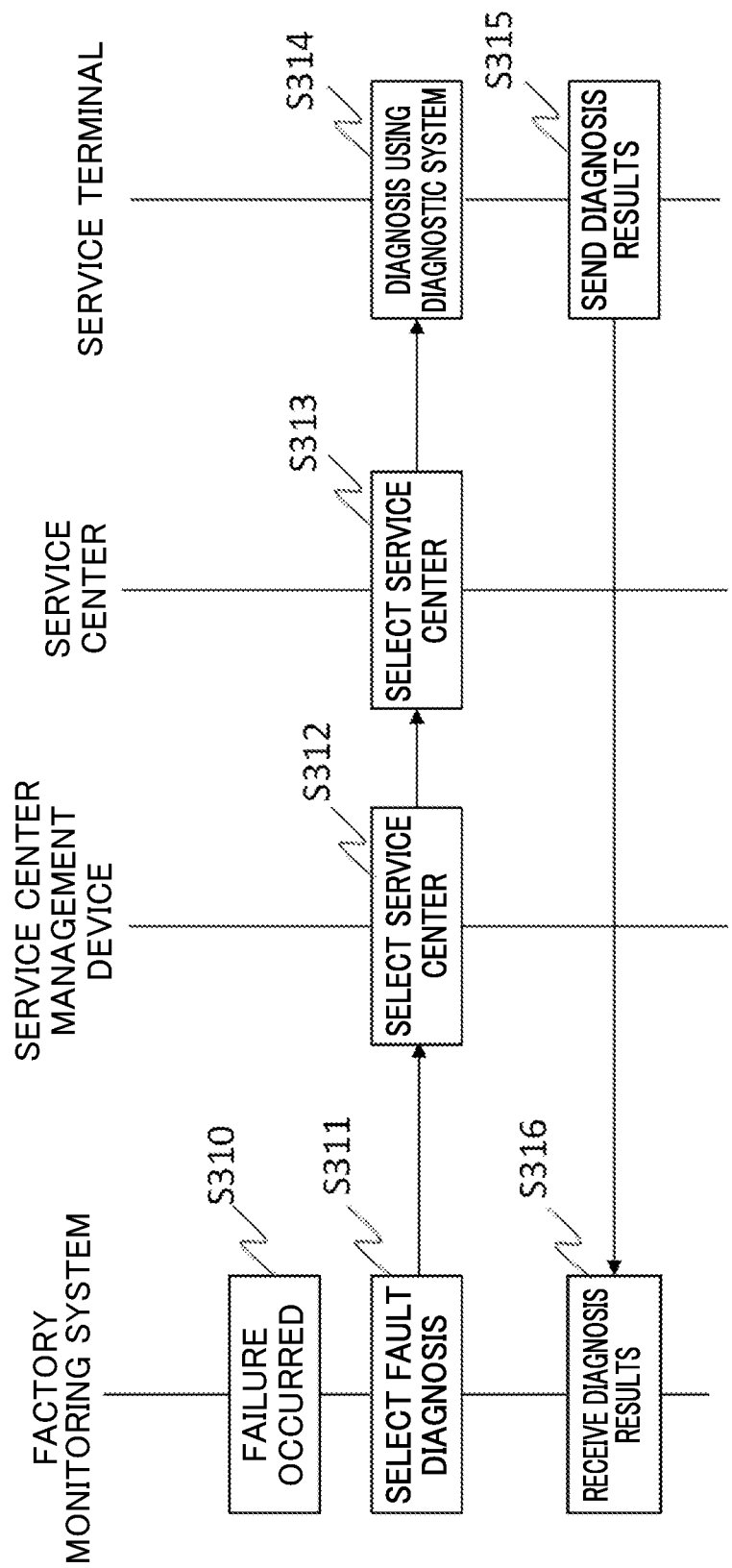
FIG. 15 is a view showing the flow of the diagnostic service system in a case of selecting a fault diagnostic system.

As shown in FIG. 15, in the case of an alarm of the machine tool occurring in Step S310, the user selects the fault diagnostic system, and inputs information into the interview sheet in Step S311. When this is done, the most suitable service center 600 is selected in Step S312, and the service center selected in Step S313 then selects the service terminal to which the most suitable responder belongs. The responder of the service terminal selected in Step S314 performs diagnosis using "3. Knowledge Diagnosis System", for example, and sends the diagnosis results to the factory monitoring system 100-1 in Step S315. The factory monitoring system 100-1 receives the diagnosis results in Step S316.

<Configuration and Operation of Service Terminal 700>

Next, the configuration of the service terminal 700, and terminal operations, including an operator on the service center side, etc., in the case of accepting the fault report from the user, for a case of the responder diagnosing this fault performing fault diagnosis of the machine, will be further explained using FIG. 2C and FIGS. 16 to 24.

Figure 2C:
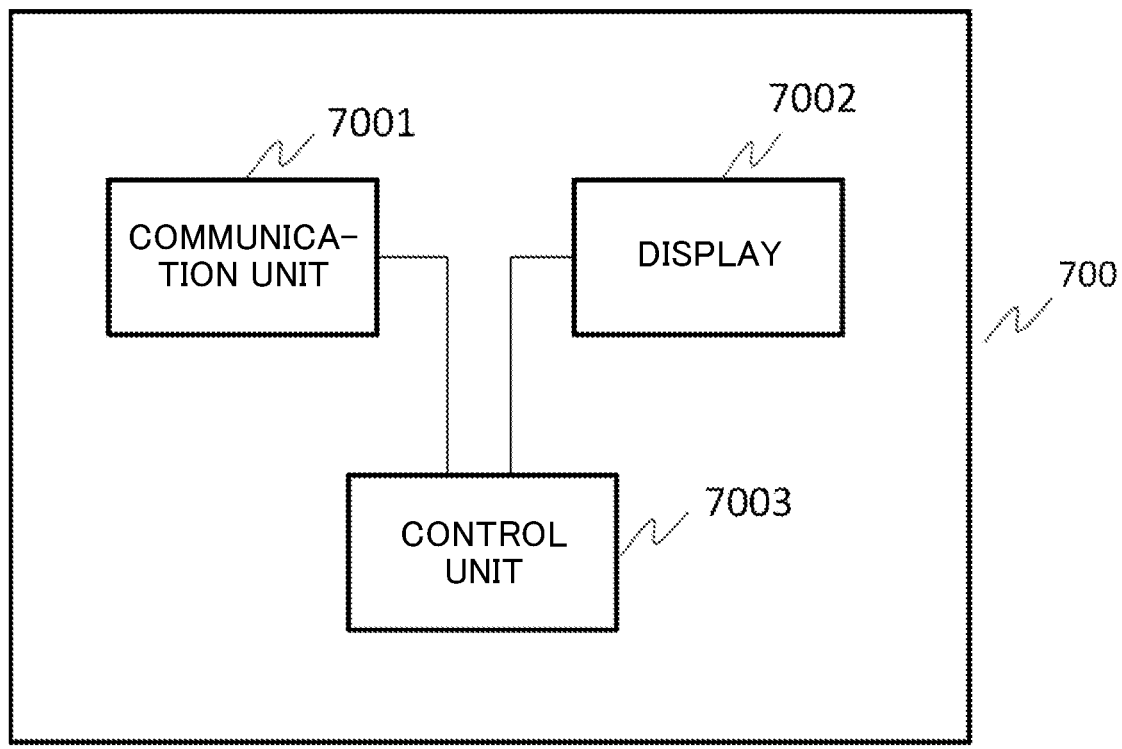
FIG. 2C is a block diagram showing the configuration of a service terminal 700.

FIG. 2C is a block diagram showing the configuration of the service terminal 700. The service terminal 700 includes a communication unit 7001 that communicates to the service control 601 via a network, a display 7002 such as a liquid crystal display that displays the screen information, etc. of FIGS. 17 to 23 sent from the service control 601, and a control unit 7003 that controls the communication unit 7001 and display 7002. The display 7002 includes a touch panel, and enables character input by a key operation screen being displayed; however, an input unit such as a separate keyboard may be provided. The control unit 7003 displays, on the display 7002, a screen of a fault diagnosis request (inquiry contents) shown in FIG. 16, which is transmitted from the service center management device 401. In addition, the control unit 7003 displays, on the display 7002, the screen information of FIGS. 17 to 23, transmitted from the service center management device 401, according to the manipulation of the touch panel or input unit. The data inputted via the touch panel or input unit is sent to the service center management device 401 via the service control 601 and service center 600. In addition, the service terminal 700 receives the required data from the service center management device 401 via the service center 600. It should be noted that, by the service center management device 401 (or service center 600) includes a Web server, and the service terminal 700 includes a Web browser, it may be configured so as to display and control the screens of FIGS. 17 to 23.

In the case of constituting the functions of the control unit of the service terminal 700 by software, the functions thereof can be realized by having programs encoding operations of the control unit 7003 of the service terminal 700 run by a computer. The computer is configured by a storage unit such as a hard disk and ROM storing the programs encoding the operations of the control unit 7003, DRAM storing data required in computations, a CPU, and a bus connecting each part. Then, it is possible to realize the functions of the control unit 7003 by storing the information required in computation in the DRAM of this computer, and causing this program to run by the CPU.

Figure 16:
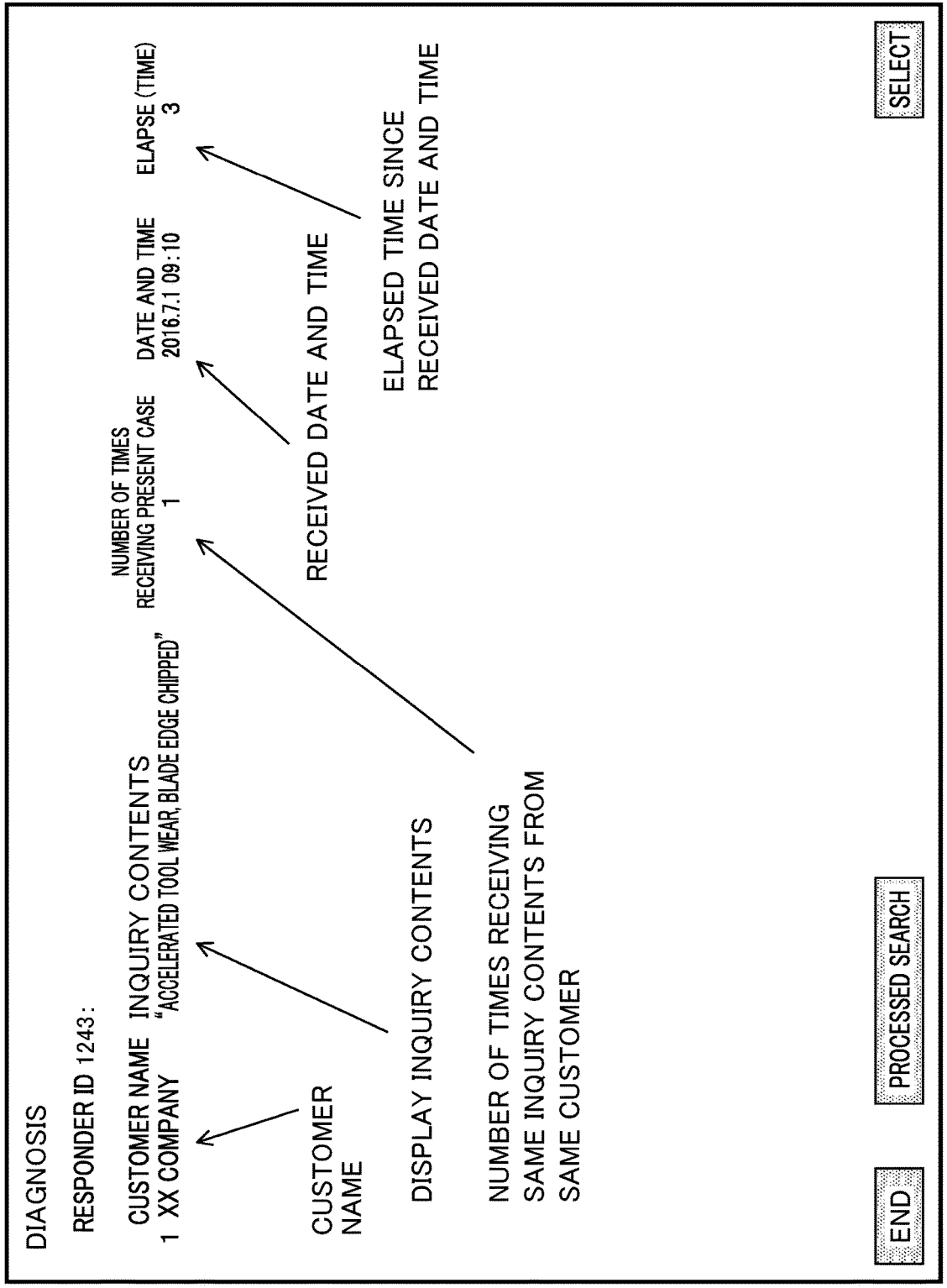
FIG. 16 is a view showing a diagnosis request screen displayed to a responder.
Figure 17:
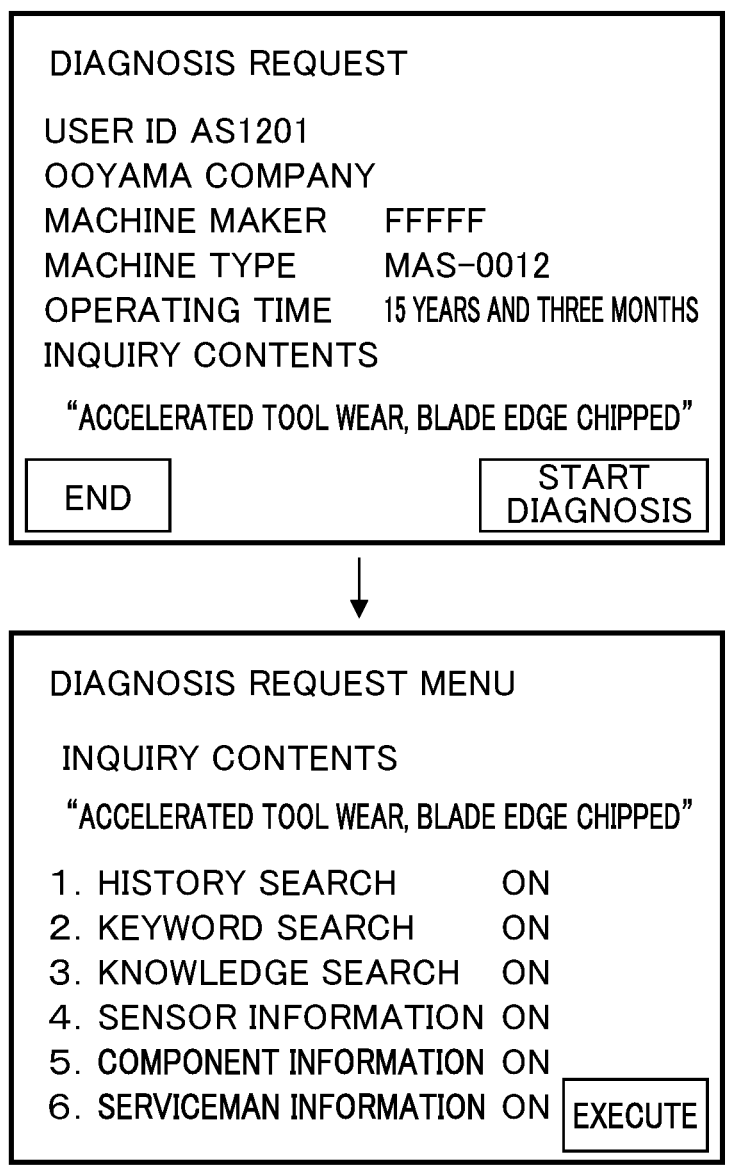
FIG. 17 is a view showing a screen of a diagnosis request menu.

The service terminal 700 provides a function that list displays fault diagnosis requests (inquiry contents) transmitted to this responder from the service control 601, as shown in FIG. 16. The responder can select an unanswered fault diagnosis request (inquiry contents) by selecting the select key. In addition, the responder can search fault diagnosis requests (inquiry contents) processed in the past by selecting the processed search key. When the responder selects a fault diagnosis request from a certain user from the list displayed fault diagnosis requests (inquiry contents), a screen of the fault diagnosis request from this user is displayed as shown in FIG. 17. When the responder selects the "diagnosis start" button, the screen of "diagnosis request menu" shown in FIG. 17 is displayed. The responder selects a function used for diagnosis, and selects the execute key. The screen of the diagnosis request menu shown in FIG. 17 displays history search, keyword search and knowledge search, sensor information, component information and field serviceman information as functions used for diagnosis. By doing this, the responder can perform fault diagnosis using these functions. It should be noted that the responder can also use the "Diagnosis Service System Menu" shown in FIG. 9.

The service terminal 700 provides a function of searching the history of fault diagnosis faults received thus far, as shown in FIG. 18. The service terminal 700 references the company name of the user and machine number, generates a past inquiry history list related to this machine from the customer service server 402, etc., and displays on the screen of "Diagnosis Request (history search)" as shown in FIG. 18. Herein, although the past fault display is set at 1 year, it is possible to arbitrarily select the number of years of the past fault display.

The service terminal 700 provides a keyword search function as shown in FIG. 19. As shown in FIG. 19, the service terminal 700 searches from the customer service server 402, etc. via the service center management device 401 for case examples thus far, based on the keyword (tool wear) inputted by the responder, and displays a list of case examples hitting this keyword (tool wear). It should be noted that the responder can select the search range such as machine maker and machine model. By doing this, a list of case examples hitting this keyword (tool wear) is displayed, and the responder is able to reference the details of a selected case example, by entering the number wanted to query and selecting the select key.

The service terminal 700 provides a knowledge search function, as shown in FIG. 20. As shown in FIG. 20, the service terminal 700 displays a screen for knowledge search, and automatically does keyword disaggregating analysis on the inquiry contents. Keyword creation is performed by a character string identical to index described in machine manual, consecutive characters, consecutive numbers, etc.

In the present case example, "tool wear", "blade edge", etc. are keywords. Only the case examples that have been settled, and replied are selected. This is due to corresponding to automatic responses later. It should be noted that the knowledge search can be performed using the knowledge system 408.

The service terminal 700 provides a query function for sensor information arranged in the machine, as shown in FIG. 21. FIG. 21 is a view showing an example of a displayed screen for retrieving sensor information to be used as a reference in the keyword of the inquiry from the factory monitoring system 100. It should be noted that, in order to compare the delivery data of the factory or basic specification of the machine, it is possible to select on this screen the display period showing sensor information from when to when is displayed. The machine queried in FIG. 21, for example, is delivered with a sensor installed to the spindle part as shown in FIG. 24. FIG. 24 is an explanatory view showing a machine tool in which a sensor is installed to the spindle part. In FIG. 24, a spindle mechanism 4001 has a vibration sensor 4002 installed, and the vibration sensor 4002 measures acceleration and vibration amplitude. A tool (cutter) 4004 is installed to the spindle mechanism 4001 via a tool clamp 4003. A work 4005 is machined by the tool (cutter) 4004.

In addition, the service terminal 700 may be configured so as to provide to the responder the same function as "7. Scheduled maintenance history". By configuring in this way, it is possible for the responder to comprehensively and efficiently monitor the machine state of each machine based on the past history data and current machine state of each machine, and based on the status of each machine, provide information related to preventative maintenance to the user, and recommend preventative maintenance to the user. In addition, as described later, in the case of recommending the replacement of components and the dispatch of a field engineer for replacing components as the preventative maintenance, as a result of periodic preventative maintenance history analysis, the responder can confirm the stock status of components from the component shipment center 500 and factory data server 406 from a service terminal, specify a field serviceman who can arrive the soonest and is suited to the category of this failure from the staff dispatch center 501 and field serviceman position information system 407, and recommend to the user including the actual schedule of preventative maintenance.

The service terminal 700 provides a search function of components, as shown in FIG. 22. FIG. 22 is a view showing an example of a screen showing component search results. In the search of components, the service terminal 700 searches repair components from repair results thus far by referencing the customer service server 402 via the service center management device 401, and determines the shipping availability of components from the factory data server 406.

The service terminal 700 provides a search function of dispatchable field servicemen, as shown in FIG. 23. FIG. 23 shows a screen showing a list of dispatchable field servicemen, and the service terminal 700 displays a list of dispatchable field servicemen by field servicemen having experience in spindle replacement from the field serviceman database of the service center 600.

By doing this, in the case of the responder determining that replacement of components and the dispatch of a field engineer for replacing components are necessary as a result of fault diagnosis, confirms from the service terminal 700 the inventory status of components from the component shipping center 500 and factory data server 406, and specifies a field serviceman suited to the category of the corresponding fault who can arrive the quickest, from the personnel dispatch center 501, and field serviceman position information system 407. Then, the responder can notify to the questioner (user) a response such as the component delivery date, arrangement of field serviceman, and arrival time. It should be noted that, in the case of the fault report route from the questioner (user) being mail or inquiry IP phone, the responder can notify the questioner (user) by mail or IP phone.

Although the diagnostic service system 1 has been explained above, the entirety or part of various servers included in the diagnostic service system 1 of the explained embodiment can be realized by hardware, software, or a combination thereof. Herein, realized by software indicates being realized by a computer reading and executing a program. In the case of constituting by hardware, a part or the entirety of the server can be constituted by integrated circuits (IC) such as LSI (Large Scale Integrated circuit), ASIC (Application Specific Integrated Circuit), gate array, and FPGA (Field Programmable Gate Array).

In the case of constituting the entirety or part of the functions equipped to the various servers included in the diagnostic server system 1 by software, the entirety or part of these functions can be realized by having programs encoding the entirety or part of the operations of various servers included in the diagnostic service system 1 run by a computer. The computer is configured by a storage unit such as a hard disk and ROM storing programs encoding the entirety or part of the operations of various servers, DRAM storing the data required in computation, a CPU, and a bus connecting each part. Then, in this computer, the information required in computation is stored in the DRAM, and the entirety or part of the functions equipped to the various servers can be realized by causing these programs to run by the CPU. In addition, it may be made a configuration in which each function equipped to the various servers included in the diagnostic service system 1 is executed on one or a plurality of servers as appropriate. In addition, each function equipped to the various servers included in the diagnostic service system 1 may be realized using a virtual server function, etc. on a cloud.

The program can be stored using various types of computer readable media, and provided to a computer. The computer readable media includes various types of tangible storage media. The computer readable media includes non-transitory computer readable media. Examples of computer readable media include magnetic recording media (for example, flexible disk, magnetic tape, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)).

The effects from the diagnostic service system and diagnostic method using a network of the diagnostic service system 1 of the present embodiment explained above will be explained.

For a plurality of machines having different specifications that are in a factory, based on the past history data and current machine state of each machine, it is possible to monitor the status of each machine, comprehensively and efficiently diagnose the maintenance contents necessitated in response to the status of each machine, and provide to the user information related to these maintenance contents. In addition, it is possible to find mutual events from the data transmitted from each of the machines, comprehensively determine the past history data and current state data, and diagnose the status of each machine in a short time. In addition, based on the machine number, the user can acquire past history data of this machine, the current machine state of this machine, etc., diagnose the possibility of abnormality occurrence in this machine according to the knowledge diagnosis, and acquire information related to preventative maintenance. By configuring in this way, the diagnostic service system 1 of the present embodiment can monitor the current state data of a machine in real-time 24 hours, and recommend accurate status diagnosis and preventative maintenance as necessary.

Modified Example 1

The present embodiment exemplifies a configuration in which the service center management device 401 provides a diagnostic service; however, it is not limited thereto. For example, it may be configured so that the factory monitoring system 100 has a diagnostic service function related to machines installed in this factory.

Modified Example 2

In the present embodiment, each system such as the knowledge diagnostic system, maintenance search history and scheduled maintenance history possessed by the diagnostic service system queries the history data related to the machine by accessing the factory data server 406 which is connected with the service center management device 401; however, it is not limited thereto. In the case of the user using a high-order system (service center management device 401, client service server 402, manual server 403, SNS 404, sales data server 405, factory data server 406, knowledge system 408 or the like), it may be configured so as to transmit history data and current state data of a machine serving as events at this moment from the factory monitoring system 100 to the service center management device 401. By configuring in this way, the high-order system can execute a diagnostic service, based on the history data and current state data of the machine serving as events at this moment, acquired from the factory monitoring system 100. Furthermore, the high-order system (service center management device 401, client service server 402, manual server 403, SNS 404, sales data server 405, factory data server 406, knowledge system 408 or the like) may be configured so as to be communicable with the factory monitoring system 100 via the service center management device 401 (more specifically, with the service center management device 401 as a gateway, for example). By configuring in this way, for example, the service center management device 401 becomes able to maintain the confidentiality of data so as to transmit only the data for which access is permitted at the factory monitoring system 100 to the high-order system.

EXPLANATION OF REFERENCE NUMERALS

100-1, 100-2, . . . , 100-*n* factory monitoring system
104 inquiry mail
105 inquiry IP phone
200-1, 200-2, . . . , 200-*n* machine
300 security shared network
401 service center management device
402 customer service server
403 manual server
404 SNS
405 sales data server
406 factory data server
407 field serviceman position information system
408 knowledge system
409 failure know-how database
500 component shipping center
501 personnel dispatch center
600-1, 600-2, . . . , 600-*n* service center
601 service control

What is claimed is:

1. A diagnostic service system comprising:
a data acquisition unit that acquires data related to at least one machine, including time information; and
a storage management unit that stores data related to each machine of the at least one machine acquired by the data acquisition unit in a storage unit together with identification information of each machine,
wherein, the diagnostic service system creates a learning model by learning a correlation between past alarm history data stored in the storage unit and related to the machine identified by the identification information and failure occurrence in the machine, diagnoses current data of the machine based on the learning model, estimates a possibility of abnormality occurrence in the machine, and provides preventative maintenance information related to the machine.

2. The diagnostic service system according to claim 1, where data related to the machine includes alarm data related to a battery included by the machine, and reset data of the alarm data.

3. The diagnostic service system according to claim 1, wherein data related to the machine includes alarm data related to a fan motor included by the machine, and ceasing data of the alarm data.

4. The diagnostic service system according to claim 1, wherein the data related to the machine includes operating data related to a servomotor controller included by the machine, and alarm data related to the servomotor controller.

5. A diagnostic method executed by at least one computer having a storage unit, the method comprising the steps of:
acquiring data related to at least one machine, including time information;
storing in the storage unit the data related to each machine of the at least one machine which was acquired in the step of acquiring, together with identification information of each machine; and
creating a learning model by learning a correlation between past alarm history data stored in the storage unit and related to the machine identified by the identification information and failure occurrence in the machine, diagnosing current data of the machine based on the learning model, estimating a possibility of abnormality occurrence in the machine, and providing preventative maintenance information related to the machine.

* * * * *